United States Patent [19]
Pall

[11] Patent Number: 5,582,907
[45] Date of Patent: Dec. 10, 1996

[54] MELT-BLOWN FIBROUS WEB

[75] Inventor: David B. Pall, Roslyn Estates, N.Y.

[73] Assignee: Pall Corporation, East Hills, N.Y.

[21] Appl. No.: 281,772

[22] Filed: Jul. 28, 1994

[51] Int. Cl.⁶ .................................................. B32B 27/34
[52] U.S. Cl. .................... 428/287; 428/224; 428/284; 428/288; 428/297; 428/304.4; 428/315.5; 428/317.1; 428/403
[58] Field of Search .................................. 418/288, 284, 418/903, 224; 428/287, 297, 304.4, 315.5, 317.1

[56] References Cited

U.S. PATENT DOCUMENTS

| | | | |
|---|---|---|---|
| 2,399,258 | 4/1946 | Taylor . | |
| 2,574,221 | 11/1951 | Modigliani . | |
| 2,656,873 | 10/1953 | Stephens . | |
| 2,664,375 | 12/1953 | Slayter . | |
| 2,785,442 | 3/1957 | Boggs . | |
| 2,939,761 | 6/1960 | Stein | 156/167 |
| 3,051,602 | 8/1962 | Schairbaum . | |
| 3,134,704 | 5/1964 | Modigliani | 156/167 |
| 3,266,966 | 8/1966 | Patchell | 156/167 |
| 3,314,840 | 4/1967 | Lloyd et al. | 156/167 |
| 3,412,865 | 11/1968 | Lontz et al. | 210/321 |
| 3,438,587 | 4/1969 | Jackson, Jr. | 242/42 |
| 3,441,468 | 4/1969 | Siggel et al. . | |
| 3,459,613 | 8/1969 | Copenhefer et al. | 156/167 |
| 3,477,892 | 11/1969 | Plymale | 156/167 |
| 3,490,975 | 1/1970 | Lightwood et al. | 156/167 |
| 3,506,420 | 4/1970 | Jackson, Jr. et al. | 65/4 |
| 3,526,557 | 9/1970 | Taylor, Jr. | 156/167 |
| 3,579,403 | 5/1971 | Stroop | 156/433 |
| 3,595,245 | 7/1971 | Buntin et al. | 131/269 |
| 3,615,995 | 10/1971 | Buntin et al. | 156/167 |
| 3,650,866 | 3/1972 | Prentice | 156/181 |
| 3,676,239 | 7/1972 | Soehngen | 156/16 |
| 3,676,242 | 7/1972 | Prentice | 156/62.4 |
| 3,704,198 | 11/1972 | Prentice | 156/62.4 |
| 3,705,068 | 12/1972 | Dobo et al. | 156/441 |
| 3,755,527 | 8/1973 | Keller et al. | 264/210 |
| 3,787,265 | 1/1974 | McGinnis et al. | 156/167 |
| 3,795,571 | 3/1974 | Prentice | 156/167 |
| 3,801,400 | 4/1974 | Vogt et al. | 156/167 |
| 3,825,379 | 7/1974 | Lohkamp et al. | 425/464 |
| 3,825,380 | 7/1974 | Harding et al. | 425/72 |
| 3,833,438 | 9/1974 | Kaneko et al. | 156/167 |
| 3,836,416 | 9/1974 | Ropiequet | 28/72 |
| 3,849,241 | 11/1974 | Butin et al. | 156/167 |
| 3,854,917 | 12/1974 | McKinney et al. | 156/167 |
| 3,933,557 | 1/1976 | Pall | 156/167 |
| 3,940,302 | 2/1976 | Matthews et al. | 156/167 |
| 3,978,185 | 8/1976 | Buntin et al. | 156/167 |
| 4,021,281 | 5/1977 | Pall | 156/167 |
| 4,032,688 | 6/1977 | Pall | 156/167 |
| 4,048,364 | 9/1977 | Harding et al. | 428/113 |

(List continued on next page.)

FOREIGN PATENT DOCUMENTS

| | | |
|---|---|---|
| 313348 | 4/1989 | European Pat. Off. . |
| 397403 | 11/1990 | European Pat. Off. . |
| 54-046811 | 4/1979 | Japan . |
| WO94/09200 | 4/1994 | WIPO . |

OTHER PUBLICATIONS

Schwarz, "New Concepts in Melt–Blown Design Appplied to Microfibers, Co–Spun and Co–Extruded Products" (Mar. 1987), presented at Int'l. Nonwovens Tech. Conf. (Hilton Head, SC, May 1987), pp. 206–220.

"Breakthrough in Nonwoven Webs Made by Improved Melt–Blowing Process," Biax–Fiberfilm Corporation Technical Bulletin 10B, Neenah, WI.

"Melt Blown," J and M Laboratories, Inc. Brochure, Dawsonville, GA.

*Primary Examiner*—James J. Bell
*Attorney, Agent, or Firm*—Leydig, Voit & Mayer, Ltd.

[57] ABSTRACT

The present invention provides a melt-blown fibrous nonwoven web comprising fibers ranging in average fiber diameters to about 2 microns or less, with a narrow fiber diameter distribution, and a high degree of weight uniformity. The present invention also provides methods of preparing, processing and using such fibrous webs, as well as products incorporating such fibrous webs.

60 Claims, 11 Drawing Sheets

U.S. PATENT DOCUMENTS

| | | | |
|---|---|---|---|
| 4,116,738 | 9/1978 | Pall | 156/167 |
| 4,172,820 | 10/1979 | Lundberg et al. | 260/23.5 A |
| 4,226,751 | 10/1980 | Lundberg et al. | 260/23.5 A |
| 4,238,175 | 12/1980 | Fujii et al. | 156/167 |
| 4,240,864 | 12/1980 | Lin | 156/167 |
| 4,259,284 | 3/1981 | Lundberg et al. | 264/187 |
| 4,340,479 | 7/1982 | Pall | 210/490 |
| 4,380,570 | 4/1983 | Schwarz | 428/296 |
| 4,415,608 | 11/1983 | Epperson et al. | 427/244 |
| 4,416,777 | 11/1983 | Kuroda et al. | 210/446 |
| 4,475,972 | 10/1984 | Wong | 156/167 |
| 4,478,620 | 10/1984 | Tamura | 55/486 |
| 4,552,707 | 11/1985 | How | 264/24 |
| 4,594,202 | 6/1986 | Pall et al. | 264/8 |
| 4,617,124 | 10/1986 | Pall et al. | 210/446 |
| 4,650,506 | 3/1987 | Barris et al. | 55/487 |
| 4,689,003 | 8/1987 | Schreiner et al. | 425/224 |
| 4,701,267 | 10/1987 | Watanabe et al. | 210/806 |
| 4,726,901 | 2/1988 | Pall et al. | 210/496 |
| 4,731,215 | 3/1988 | Schwarz | 264/517 |
| 4,738,740 | 4/1988 | Pinchuk et al. | 156/167 |
| 4,764,324 | 8/1988 | Burnham | 264/103 |
| 4,774,001 | 9/1988 | Degen et al. | 210/490 |
| 4,826,642 | 5/1989 | Degen et al. | 264/45.3 |
| 4,838,972 | 6/1989 | Daamen et al. | 156/175 |
| 4,855,063 | 8/1989 | Carmen et al. | 210/749 |
| 4,880,548 | 11/1989 | Pall et al. | 210/435 |
| 4,889,630 | 12/1989 | Reinhardt et al. | 210/490 |
| 4,925,566 | 5/1990 | Bardot et al. | 210/651 |
| 4,925,572 | 5/1990 | Pall | 210/767 |
| 4,936,998 | 6/1990 | Nishimura et al. | 210/638 |
| 4,999,080 | 3/1991 | Boich | 156/441 |
| 5,061,170 | 10/1991 | Allen et al. | 425/197 |
| 5,069,945 | 12/1991 | Wrasidlo | 427/245 |
| 5,079,080 | 1/1992 | Schwarz | 428/288 |
| 5,089,122 | 2/1992 | Chmiel | 210/490 |
| 5,102,484 | 4/1992 | Allen et al. | 156/244.11 |
| 5,122,211 | 6/1992 | Roach | 156/173 |
| 5,145,689 | 9/1992 | Allen et al. | 425/72.2 |
| 5,160,746 | 11/1992 | Dodge, II et al. | 425/7 |
| 5,266,219 | 11/1993 | Pall et al. | 210/767 |
| 5,273,565 | 12/1993 | Milligan et al. | 55/528 |
| 5,298,165 | 3/1994 | Oka et al. | 210/645 |

MELT-BLOWN FIBROUS WEB

TECHNICAL FIELD OF THE INVENTION

The present invention pertains to melt-blown fibrous webs and their preparation. Such fibrous webs are particularly suitable as filtration media.

BACKGROUND OF THE INVENTION

In the widely practiced Exxon melt-blowing process, molten resin, for example molten polypropylene, is extruded through a row of linearly disposed holes of diameter about 0.35 to 0.5 mm. The holes are drilled in linear array on about 1 to 2 mm centers into a flat surface about 1 to 2 mm wide, with the surface being located as shown in FIG. 1 at the apex of a member having a triangular cross section, and with the angles at the apex being about 45° to 60° to the center line. Surrounding the apex 11 as shown in FIG. 1 are two slots 12, 13, one on each side, through which is delivered heated air, which attenuates the molten resin extruded through the holes, thereby forming a stream of fibers. The fibers are collected on one side of a moving screen which is separated from the nozzle tips by about 10 or more cm, with the other side of the screen being connected to a suction blower. In operation, most of the fibers are collected on the screen to form a low density web with a rough surface; however, a significant proportion of the fibers escape into the surroundings, and a suction hood into which they are collected and sent to waste is provided.

The collected web is quite weak, with tensile strengths well below about 1.5 kg/cm$^2$; for example, a 0.06 cm thick web would fail at an applied force of less than 0.09 kg/cm of width, and elongation prior to failure is less than about 5 to 10%. The fibers have a wide size distribution, with the largest fibers being ten or more times larger than the smallest, and the average fiber diameter is about five to seven or more times the smallest fiber diameter. Many of the fibers are twinned, with a twin being defined as two parallel fibers adhering to each other along a length of 20 or more times their average diameters, while others are roped, i.e., consist of two or more fibers twisted about each other in a form resembling a rope. Roped fibers behave in practice, for example in filtration, much like a single fiber of diameter about equal to that of the rope. Both twinning and roping cause the collected web to have a high pressure drop and low filtration efficiency. Fibers bonded in a twin are less efficient in a filter than two separate fibers. Shot—i.e., small pellets of unfiberized resin interspersed in the web—are also a problem. As stated in U.S. Pat. No. 3,825,380, one of the Exxon patents: "The Naval Research Laboratory work covered die-nose included angles of 30° to almost π° with 60° recommended as the best compromise between making shot and rope." The products of the present invention are by contrast substantially free of shot and roping. The rough, rather fuzzy surface of the Exxon system web is undesirable for many applications, for example, for use in disposable clothing.

The Exxon system is inefficient by virtue of its geometry. When the two air streams converge, a portion of the energy required to form fibers of the resin is dissipated in proportion to the component of their velocities perpendicular to the center line of the apparatus. A further inefficiency is the rectangular shape of the air stream which acts on each nozzle; if 0.5 mm diameter holes are located on 2 mm centers, a rectangular air stream 2 mm wide acts on each 0.5 mm diameter resin passageway. Because the liquid stream is circular, that portion of the air issuing from a corner of the rectangle farthest from the resin nozzle is relatively ineffective, generating a high degree of turbulence with a relatively small contribution to fiber formation. As a result of these inefficiencies, the cost of energy to compress and heat the air in the Exxon process is much larger than it would be if each resin nozzle were to receive its own supply of air through a circular annulus. Due to the high volume of air required to fiberize a given weight of resin, the distance from the resin nozzle outlet to the fiber collection surface in usual practice exceeds about 10 to 13 cm, and this relatively long passage through very turbulent air causes the undesirable roping and twinning in the fibers of the collected web. Attempting to operate at much less than 10 cm makes collection on the vacuum screen difficult, unless the fibers are so hot as to be semi-molten, which produces a near to solid product which is inefficient as a filter. In a basic deficiency of the Exxon system, the molten resin is disrupted external to the fiberizing die and is simultaneously attenuated to form fibers; there is no clear delineation between disruption and fiber formation, and as a result control of fiber formation is poor.

The present invention employs self-contained individual fiberizing nozzles comprising an annular air passage. These fiberizing nozzles have been used to make commercially available filter elements tradenamed "HDC" (Pall Corporation, East Hills, N.Y.), are capable of making fibrous sheet media with average fiber diameters as small as about 3.5 μm, with a lower limit of about 3.0 μm, and are operated at a die-to-collector distance (hereinafter DCD) of about 5.5 to 9 cm. The present invention also comprises recently developed novel self-contained fiberizing nozzles capable of making fibrous sheet media with average fiber diameters less than about 1.0 μm, are operated in the DCD range of about 2.8 to 9.0 cm, and make product with controlled orientation of the fibers.

Such a fiberizing nozzle is depicted in FIG. 2, wherein the fiberizing nozzle 21 contains a capillary 22 through which the resin is pumped and a circular annulus 23 through which hot air is delivered. The pumped resin exits the capillary 22 into the resin disruption zone 24 and then into the nozzle channel 25 where the resin, now fragmented into tiny droplets, is carried in the air stream out of the nozzle tip 26.

Because the air supply is used more efficiently and is correspondingly less in proportion to the weight of the product web, the fiberized product of the present invention can be collected as a web by impinging it on a solid collecting surface, as opposed to the vacuum backed screen of the Exxon apparatus. In another marked improvement on the prior art, the DCD (distance between the nozzle tip 26 in FIG. 2 and the target collecting surface) may be shortened to under about 2.8 to 5.5 cm, i.e., about one half or less than used for the Exxon system, thereby reducing the width of the fiber stream and further improving fiber collection efficiency.

U.S. Pat. No. 4,021,281 describes a method in which attenuated fibers are produced by a die not materially different from the Exxon dies, in which the molten resin is disrupted externally to the die. The fibers produced are described in column 8, lines 48–53, as "collected in a randomly oriented heterogeneous intertwined arrangement on the mandrel, since virtually no control is exercised over the path the fibers follow in their trajectory from the spinning die to the mandrel. By the time the fibers reach the mandrel, they are either already broken up or disrupted into discontinuous lengths, or they are still attached to the orifice from which they are spun by a portion which is molten. In the latter case, the fiber is continuous."

Contrasted with the above, the fibers of the instant invention are formed within the fiberizer nozzle, and can be seen by direct observation through a microscope to be fully formed and not in contact with the orifice out of which the fiber stream passes. The absence in the invention of disruption external to the orifice is essential to the formation of a web in which the fibers are continuous and distinctly oriented in a controlled fashion.

Thus the fibers of the present invention are generated, controlled, and collected in a manner which produces a web of oriented fibers, contrasted with, as stated in column 8, lines 48–52, of U.S. Pat. No. 4,021,281, a heterogeneous intertwined arrangement, with no control over the path of the fibers.

The collection system of U.S. Pat. No. 4,021,281 illustrated in FIG. 1 of that patent is generally not capable of making product webs of the uniformity currently required for use in diagnostic devices, which are used in small pieces, for example as narrow as 0.5 cm wide. In part this is due to relatively poorer control of the fiber deposition and in part because, as may be seen in FIG. 1 of the patent, there is a considerable length of fiber between 36 and 37, which tends to stretch and contract lengthwise during operation, thereby creating zones which contain too much or too little fiber.

While finer fibers and improved collection are made possible by the use of individual nozzles, their use has the disadvantage that the product web has a stripy appearance. The stripes reflect the spacing between adjacent nozzles. Despite this disadvantage the products of this system have proved themselves in a wide variety of applications, for example in applications such as the filtration of liquid foods, in which a single layer of the filter medium is often used.

The present invention provides a convenient means to collect the output of individual fiberizing nozzles in the form of a web which is not only substantially free of striping, but is characterized by a high degree of uniformity, for example by weight distribution varying less than about 1% over a fifty cm span. Such a degree of uniformity makes the product useful in critical applications such as diagnostic devices, as well as for other applications where near to perfect uniformity is required.

BRIEF SUMMARY OF THE INVENTION

The present invention provides a melt-blown fibrous nonwoven web of fibers having a small average fiber diameter, preferably in combination with a narrow distribution of fiber diameters and a uniform weight distribution. The present inventive melt-blown fibrous nonwoven web is also substantially free of roping, twinning, and shot and can be characterized by a tensile strength in a first direction several times the tensile strength in a second direction 90° to the first direction. The present inventive melt-blown fibrous nonwoven web can be further characterized by a highly desirable lateral flow time.

The present invention also provides a method of preparing a melt-blown fibrous nonwoven web comprising extruding molten resin from two parallel rows of linearly arranged, substantially equally spaced nozzles to form fibers onto the surface of a cylindrical collector having a longitudinal axis arranged parallel to the rows of nozzles, wherein the rows of nozzles are offset from each other and are angled toward each other. The present invention also provides a method for preparing a melt-blown fibrous nonwoven web comprising modifying the present inventive melt-blown fibrous nonwoven web to alter the CWST and/or voids volume of the web as to obtain a desired lateral flow time.

The present invention further provides a filter element comprising the present inventive melt-blown fibrous nonwoven web and a housing therefor, as well as a method of filtering a fluid comprising passing a fluid through the present inventive melt-blown fibrous nonwoven web. In addition, the present invention provides a porous composite structure comprising at least one porous sheet containing thereon a melt-blown fibrous nonwoven web, wherein no more than about 10% of the pores of the porous sheet are blocked by the melt-blown fibrous nonwoven web.

BRIEF DESCRIPTION OF THE DRAWINGS

FIG. 6A is an end view of another melt-blowing apparatus with two rows of angled and offset fiberizing nozzles, while

DETAILED DESCRIPTION OF THE PREFERRED EMBODIMENTS

Figure 1:
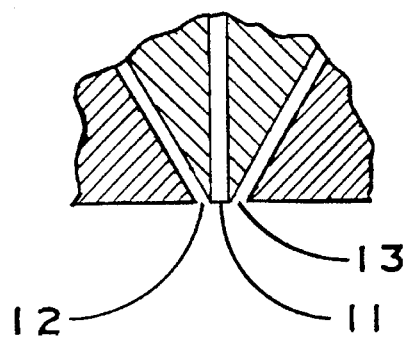
FIG. 1 is a cross-sectional view of a conventional fiberizing orifice.
Figure 2:
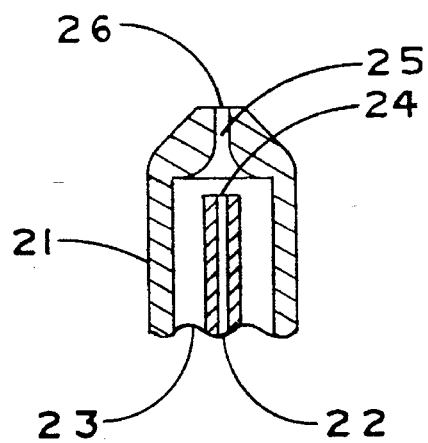
FIG. 2 is a cross-sectional view of a preferred fiberizing nozzle.

The present invention provides a melt-blown fibrous nonwoven web of fibers having an average fiber diameter of less than about 2 µm, preferably less than about 1.5 µm, and more preferably less than about 1 µm. Moreover, the present inventive melt-blown fibrous nonwoven web can have a narrow distribution of fiber diameters, preferably such that 90% of the fibers of the web have a diameter ranging from a minimum fiber diameter to a maximum fiber diameter which is no more than about three times, preferably no more than about two times, and more preferably no more than about 1.5 times, the minimum fiber diameter. The present inventive melt-blown fibrous nonwoven web can be further characterized by a weight distribution varying by less than 1% when measured in both the longitudinal and transverse directions, with such weight distribution measured along 0.64×13 cm areas and on 2.54 cm squares.

The present inventive melt-blown fibrous nonwoven web is also substantially free of roping, twinning, and shot and can be characterized by a tensile strength in a first direction at least about 1.5 times, preferably at least about 2 times, and more preferably at least about 4 times, the tensile strength in a second direction 90° to the first direction.

The present inventive melt-blown fibrous nonwoven web can be further characterized by a 2 cm lateral flow time of about 40 seconds or less in a first direction and/or a 4 cm lateral flow time of about 225 seconds or less in a first direction. Such webs can be prepared wherein the lateral flow time in a second direction 90° to the first direction is different than the lateral flow time in the first direction. Moreover, such webs can be prepared such that the web exhibits substantially no bead front lag in the first and/or second directions.

The present invention also provides a method of preparing a melt-blown fibrous nonwoven web comprising extruding molten resin from two parallel rows of linearly arranged, substantially equally spaced nozzles to form fibers onto the surface of a cylindrical collector having a longitudinal axis arranged parallel to the rows of nozzles, wherein the rows of nozzles are offset from each other and are angled toward each other. The rows of nozzles are preferably offset from each other by about one-half the spacing between the nozzles within each row and the rows of nozzles are preferably angled toward each other by substantially equal but opposite angles, e.g., each of the rows of nozzles is angled by about 25° or less, preferably about 5° to about 20°, more preferably about 10° to about 16° from a vertical plumb line originating at the center of the cylindrical collector. The cylindrical collector can be rotated at any suitable surface velocity, generally at least about 20 m/min and preferably not exceeding about 600 m/min. The cylindrical collector can have any suitable diameter, preferably about 5 cm to about 150 cm. The nozzles can be spaced any suitable distance from the cylindrical collector, preferably about 2 cm to about 8 cm, more preferably about 2 cm to about 5 cm. The cylindrical collector is preferably translated at a rate not exceeding about 2 cm/revolution, more preferably at a rate not exceeding about 1 cm/revolution, and most preferably at a rate not exceeding about 0.75 cm/revolution. Within each of the rows the nozzles can be spaced apart any suitable distance, generally about 2 cm or less, preferably about 0.25 cm to about 2 cm, more preferably about 0.1 cm to about 1.5 cm, and most preferably about 0.37 cm to about 1.2 cm, such as about 0.5 cm to about 1 cm. The parallel rows can be spaced apart any suitable distance, preferably such that the nozzle tip to nozzle tip separation between rows is about 1 to 2 cm. Moreover, the present inventive method is preferably carried out while a negative pressure is maintained between the rows of the nozzles.

The present invention also provides a method for preparing a melt-blown fibrous nonwoven web comprising modifying the present inventive melt-blown fibrous nonwoven web to alter the CWST of the web to between about 73 and about 100 dynes/cm so as to obtain a desired lateral flow time. Similarly, the present invention provides a method for preparing a melt-blown fibrous nonwoven web comprising modifying the present inventive melt-blown fibrous nonwoven web to alter the voids volume of the web so as to obtain a desired lateral flow time, preferably such that the voids volume is in the range from about 60% to about 90%.

The present invention further provides a filter element comprising the present inventive melt-blown fibrous nonwoven web and a housing therefor, as well as a method of filtering a fluid comprising passing a fluid through the present inventive melt-blown fibrous nonwoven web.

In addition, the present invention provides a porous composite structure comprising at least one porous sheet containing thereon a melt-blown fibrous nonwoven web, wherein no more than about 10%, preferably no more than about 5%, of the pores of the porous sheet are blocked by the melt-blown fibrous nonwoven web. The melting point of the fibrous melt-blown nonwoven web is preferably lower than that of an adjoining porous sheet. In the porous composite structure, at least one porous sheet can be a melt-blown fibrous nonwoven web, and two porous sheets can be bound together by the melt-blown fibrous nonwoven web. Similarly, in the porous composite structure, one of the porous sheets can be a microporous membrane and the other of the porous sheets can be a melt-blown fibrous nonwoven web. Also, the porous composite structure can comprise a microporous membrane or an impermeable sheet with a melt-blown fibrous nonwoven web adhered thereto.

A Single Row of Individual Nozzles

Figure 3:
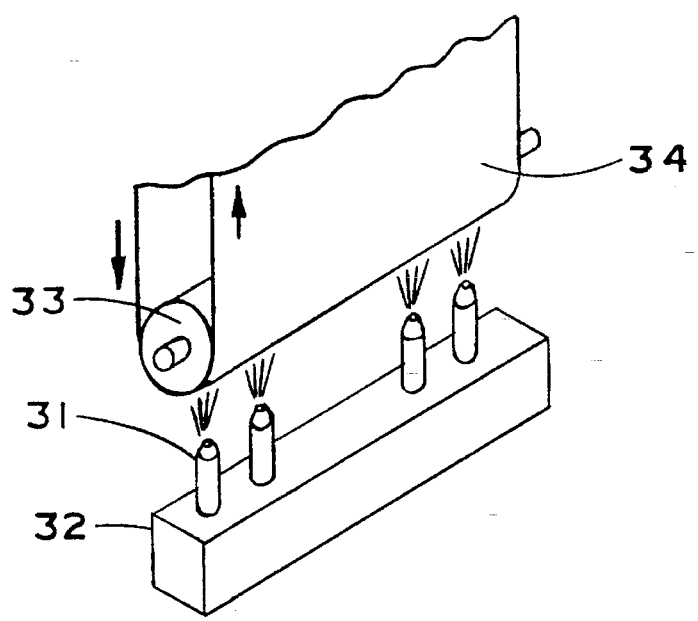
FIG. 3 is a perspective view of a melt-blowing apparatus with a single row of fiberizing nozzles.

An arrangement for collecting a fibrous web from a single row of individual fiberizing nozzles is shown in perspective view in FIG. 3, with each fiberizing nozzle 31 being connected to a double manifold 32, one portion of which is arranged to supply molten resin to the nozzles from an extruder and the other portion to supply heated air at controlled temperature and pressure. The nozzles 31 are arranged in a single line, spaced apart from each other by a distance which is preferably in the range between about 0.4 and 1.5 cm and more preferably in the range of about 0.6 to 1.2 cm. This arrangement, as one might expect, yields a striped product, which nevertheless has properties substantially superior to the products of the Exxon system with respect to better fiber conformation, and has the ability to make finer fibers which in use remove smaller particles and have longer life in service.

The webs formed by the apparatus of FIG. 3 may be thick enough and sufficiently coherent to permit formation directly onto the outer surface of cylinder 33, from which they can be withdrawn continuously in the manner of U.S. Pat. No. 4,021,281; however, it may be expedient, particularly when the web weight is less than about 3 to 10 milligrams per square cm, to have the web collected on the surface of a supporting fabric 34 which may for example be an inexpensive non-woven, permitting the product to be collected, stored, and later used with the fabric in place or separated from the fabric prior to se.

Multiple Row Arrays of Fiberizing Nozzles

Figure 4B:
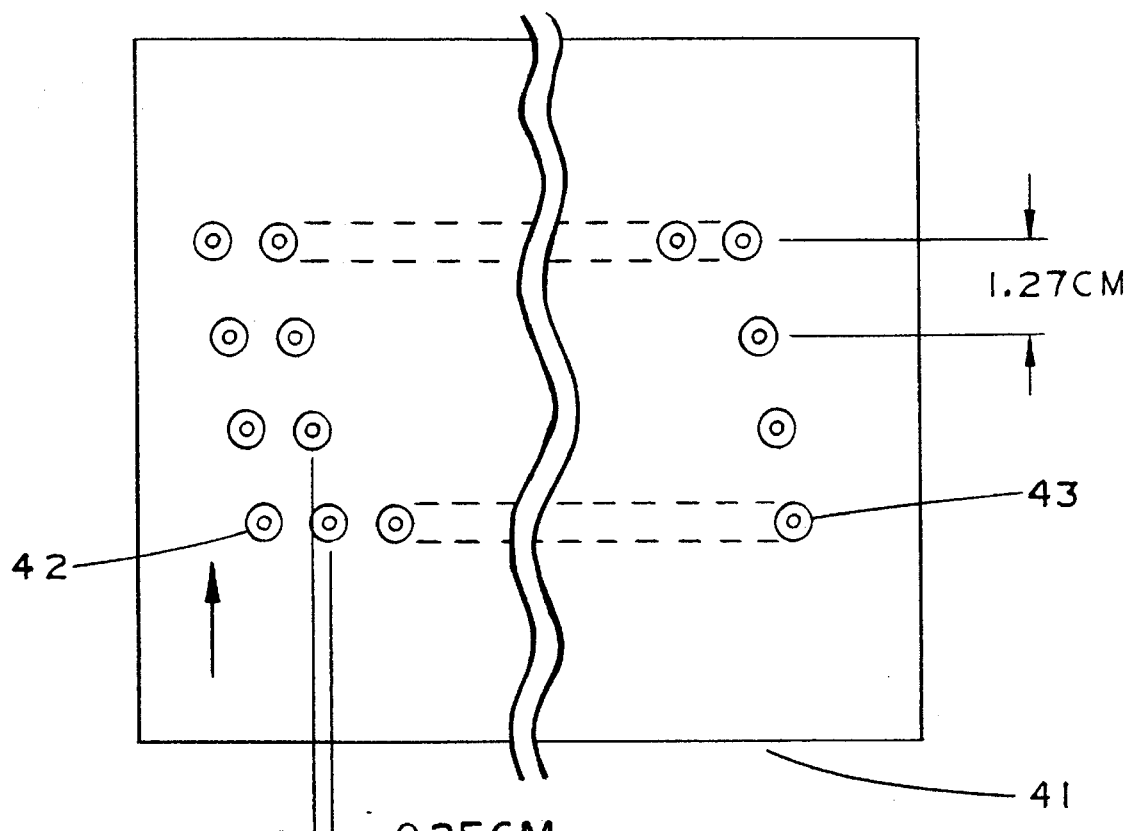
FIG. 4B is an enlarged plan view of the same apparatus depicted in FIG. 4A as seen along line A—A of FIG. 4A.
Figure 4A:
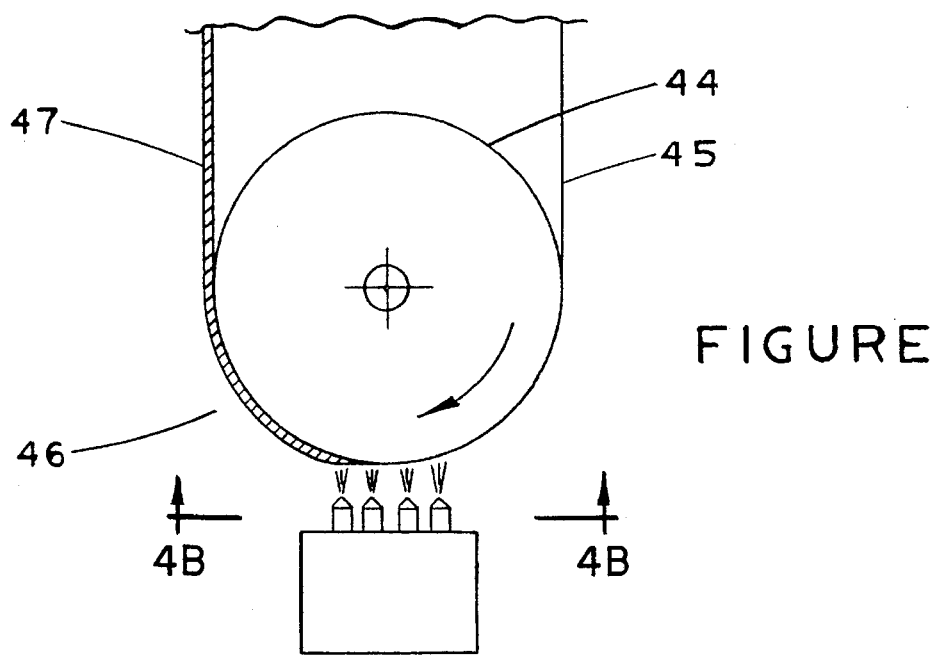
FIG. 4A is an end view of a melt-blowing apparatus with four rows of fiberizing nozzles.

An apparatus which was used in an attempt to reduce or to eliminate striping is shown in FIGS. 4A and 4B, where FIG. 4A is an end view of an apparatus differing from that of FIG. 3 only in the substitution of a fiberizer assembly with four rows of fiberizing nozzles, and FIG. 4B is an upwardly facing section along the line A—A of FIG. 4A. In FIG. 4B, 41 refers to the collection surface, while 42–43 delineates a row of 106 linearly located fiberizing nozzles in which the fiberizer nozzles are spaced apart by 0.25 cm, 42–43 being one of four such rows, the rows being spaced apart from each other by 1.27 cm. In FIG. 4A, 44 is a rotating cylinder, around 180° of which travels a 110 cm wide smooth surfaced non-woven fabric 45. The fabric is impinged upon by the fiber streams 46 from the 4×106=424 fiberizing nozzles 42–43 in the manner shown in FIGS. 4A and 4B, thus forming a porous medium 47 carried by the fabric 45, from which the porous medium may be removed and separately rerolled.

As fabric 45 travelled over the rotating cylinder 44, it was impinged upon by 424 fiber streams 46, each stream originating from a nozzle spaced 0.25 cm from its diagonal neighbor. Since each fiber stream could be seen visually to lay down a swath about 0.5 cm wide as it struck the surface of the fabric 45, and since the nozzles were on 0.25 cm centers, it was anticipated that a uniform or nearly uniform fiber distribution would be obtained, thus diminishing or eliminating striping; instead the striping was accentuated from that obtained with a single row die. The stripes were spaced 1 cm apart, with the more transparent portions containing about one half the quantity of fiber contained in the less transparent portions.

Careful visual observation of the fiber streams while the apparatus was being operated revealed that as the fabric 45 to which the fiber streams were directed moved over the die in the direction of the arrows depicted in FIGS. 4A and 4B, the fiber stream originating from the first row of 106 dies 42–43 impinged on the fabric and formed 106 ridges of fibers, each of which caused the 106 fiber streams from the following three rows to be deflected from the vertical direction of the nozzle from which they originated in a manner such as to deposit a proportion of their fibers on the ridges made by the first row, thus enlarging the already deposited ridges of fibers rather than starting new ridges. To review, referring again to FIGS. 4A and 4B, with the fabric moving in the direction of the arrows, nozzles 42–43 deposited ridges which were located where one would expect, i.e., in line with the nozzles; however, the fiber streams from all of the other nozzles were visibly deflected towards the ridges made by the first row of nozzles 42–43, the last of the four rows surprisingly being deflected a full 0.75 cm. In this manner a product web was obtained which was heavily striped on 1 cm centers.

The aerodynamics which might account for this unexpected behavior have not been explained quantitatively, but qualitatively a consequence of Bernoulli's theorem can be applied, i.e., a rapidly moving stream of gas is deflected towards an adjacent solid surface, in this case toward the ridges formed by the leading row of fiberizing nozzles.

Crossed Fiber Streams

Figure 5:
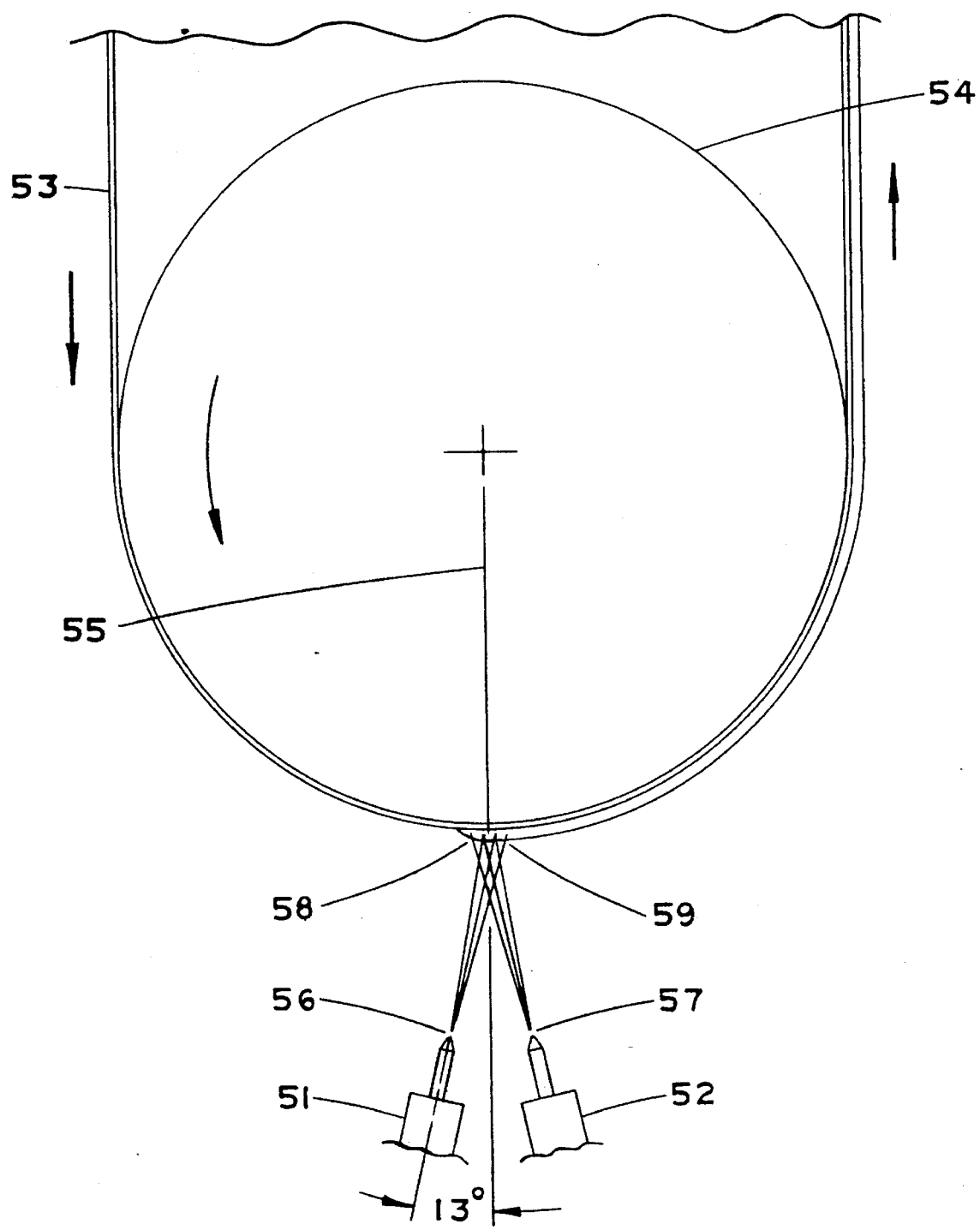
FIG. 5 is an end view of a melt-blowing apparatus with two rows of angled and offset fiberizing nozzles.

An end view of a configuration of a crossed fiber stream melt-blowing system of the present invention is shown in FIG. 5, in which 54 is a rotating cylinder over which a fabric 53, typically a disposable non-woven is drawn, moving counterclockwise around the metal cylinder 54 towards a rewind station, which is not shown. Double manifold 51, of length a few centimeters less than the width of web 53, feeds hot air and molten resin to a row 56 of fiberizing dies tilted towards the right relative to vertical plumb line 55 drawn from the center of cylinder 54, generating fiber streams which strike the collector cylinder at 59. A matching set comprising manifold 52 and nozzles 57 is tilted towards the left and deposits resin on the collector surface at 58; if the axial spacing (perpendicular to the paper) between adjacent nozzles is distance D, then the two rows of nozzles are offset from each other by distances 0.5 D, thus the fiber streams cross each other. The distance 58–59 by which they overlap may in the practice of the invention be as much as 1 cm or more. The distance 58–59 may be zero, and a limited negative lap (separation) may be acceptable in some circumstances. Over the whole range of overlap, from 1 cm or more to a negative lap, no interference between adjacent fiber streams can be visually detected, an observation very much contrary to the results described above for multiple rows of nozzles. As a result, media made using the crossed fiber stream system are more uniform, and, while not eliminated, striping is reduced.

The degree of overlap is determined in part by the DCD. With a 15 cm diameter collection cylinder and an angle between the two sets of nozzles of 26°, and the distance between the nozzle tips 56–57 set to 1.4 cm, a preferred overlap is about 0.5 cm for a relatively large DCD of 6 to 7 cm, and between about 0.23 cm to zero overlap for relatively smaller DCDs of about 4 to 2.8 cm.

In general, the DCD is smaller when a porous medium of higher density with lower voids volume and higher tensile strength is desired. The DCD of the processes of the invention ranges from about 2.7 cm to about 7.5 cm. Parameters other than DCD which can be varied to produce a desired product include the angles of tilt, the distance from die tip 56 to die tip 57, the offset if any from the center line of the matched fiberizer set to the center vertical plumb line 55 of the collection cylinder, and the temperature, flow rates, and fiberizing characteristics of the resin which is being fiberized, as well as the volume, temperature, and pressure of the air delivered to the fiberizing nozzles.

Throughout the many variations of operating conditions described above, the crossed fiber system has been consistent in showing no interaction between neighboring product streams; the fibers generated by this system collect on the target surfaces in exactly the manner expected for a system of a given geometry.

The Scanning System

Figure 6C:
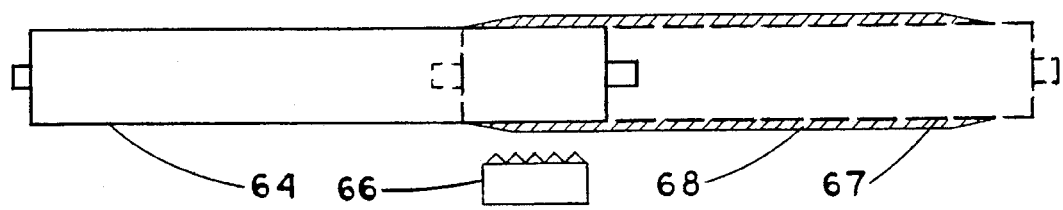
FIG. 6C is a side view of a melt-blowing apparatus showing the translation of the collecting cylinder.
Figure 6B:
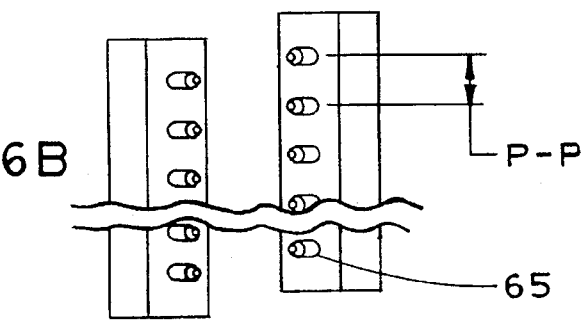
FIG. 6B is a top view of the same apparatus as seen along line A—A of FIG. 6A.
Figure 6A:
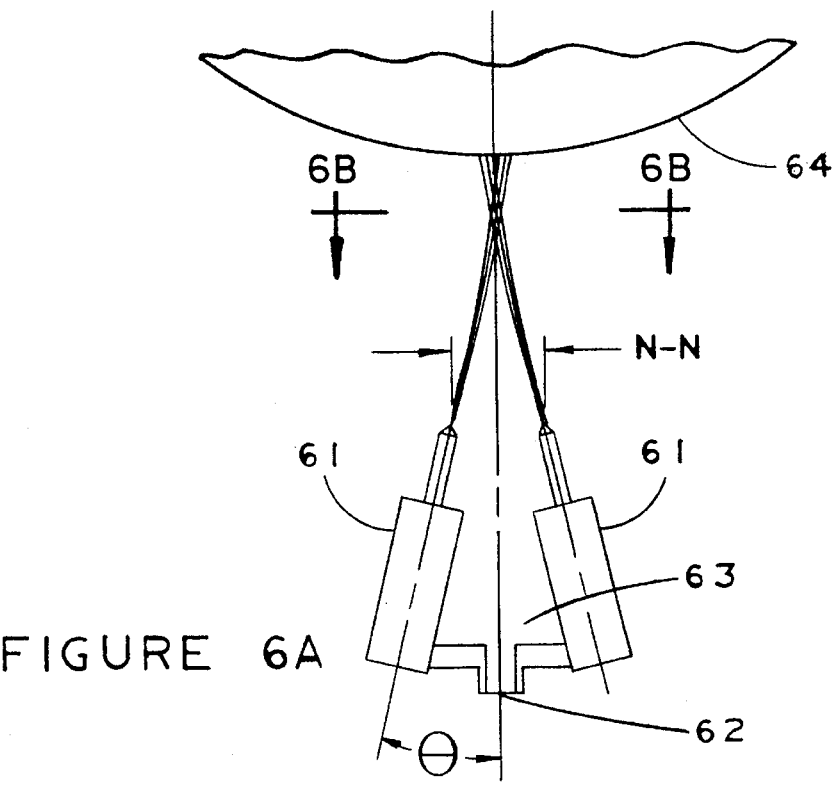

FIGS. 6A–6C depict the scanning system of the present invention. In FIG. 6A the manifolds 61 are located similarly to and have the same function as manifolds 51 and 52 of FIG. 5. The area between the two manifolds has been enclosed at the bottom and at both ends to form a cavity 62 fitted at its lower end with a cylindrical opening 63. Cylinder 54 of FIG. 5 has been replaced by cylinder 64, and fabric 53 has been removed. FIG. 6B is a partial view along line A—A in FIG. 6A, showing tilted nozzles 65 located on P—P centers, the nozzles of the one row offset by 0.5 P from those of the other row. FIG. 6C shows in elevation view a crossed stream fiberizer assembly 66 located near to the right end of collector cylinder 64.

In use the fiberizer assembly 66 is stationary while collector cylinder 64 is rotated, for example at a surface velocity in the range of about 20 to 600 meters per minute, and may be simultaneously translated in the range of about 0.01 to 0.1 cm per revolution. The rotation and translation rates are maintained constant while collector cylinder 64 is moved across the fiberizer to position 67 shown in broken lines, in the course of which a fibrous web 68 is formed by the impinging fibers. The web grows in length until the translation is complete and the whole surface of the collector cylinder is covered. The cylinder of porous medium may then be slit along its length, and its ends trimmed. The so formed sheet may be inspected on a light box where it is seen to be uniform and free of any visually detectable striping.

If while using the crossed fiber streams of the invention the translation per revolution (hereinafter T/R) is increased above 0.1 cm per revolution in about 0.04 cm or smaller increments while holding constant a given combination of fiberizing nozzle dimensions, nozzle placement, DCD, mandrel diameter, mandrel rotation rate, and resin composition, and each so made specimen is then examined sequentially on a light box, a T/R will be reached at which the existence of parallel stripes in the product becomes readily apparent. By then backing off from that T/R by about 0.04 cm, a product of excellent uniformity is produced, and such a product is encompassed by the present invention. Products made using the crossed fiber streams of the invention which show faint or moderate striping may still be superior with respect to uniformity when compared with products of any previous melt-blowing method; such products are also encompassed by the present invention.

The magnitude of the T/R which produces a stripe-free product is influenced by factors including the nozzle-nozzle spacing, which is preferred to be as small as is practical; fiberizing die assemblies with a 0.76 cm nozzle center to nozzle center spacing have been used to produce the examples of the invention, as preceding tests using similar apparatus spaced on 1.02 cm spacing were less successful. Under some circumstances, for example when operating with very large DCD's, stripe-free products may be obtained with nozzle spacing well over 1 to 2 cm, and such products fall within the scope of the present invention. Spacing less than 0.76 cm is desirable and may be possible, albeit such reduction would be somewhat restricted by design considerations such as the dimension of air and resin flow passages. Other criteria for achieving perfect uniformity are that rates of revolution, translation, and resin delivery must be constant throughout the formation of the entire length of the sheet.

Most of the examples of the present invention were performed using convenient T/R values which were a fraction, for example less than one quarter to one half of the maximum T/R. In an experiment dedicated to exploring the maximum T/R possible, in which the air nozzle diameter was a relatively large 0.17 cm, the air temperature was 310° C., 305° C. resin was delivered at 0.51 g/min/nozzle and DCD was 4.1 cm, excellent uniformity on light box inspection was obtained in the T/R range from 0.12 to 0.44 cm, and uniformity remained almost as good up to T/R of 0.63 cm, with visible stripes appearing in the product at 0.76 cm.

In other experiments at various fiberizing conditions the onset of stripy conditions was seen to occur at much lower values. Occasionally conditions were such that striping appeared at a lower value, and then disappeared as the T/R was further increased up to about 0.29 cm (0.375× the 0.76 cm nozzle spacing), and a further "node" at which the product improved has been observed at 0.48 cm (0.625× the 0.76 cm nozzle spacing).

Prior to the conception of the crossed fiber stream system for delivering fibers to a translating cylinder, attempts were made to use the translating cylinder with other types of fiber delivery systems, including single and double rows of nozzles (not crossed) with the same fiberizing nozzles and with alternate nozzles. None of these yielded other than clearly striped product.

Other fiberizing systems, for example those based on the Exxon process, may yield unstriped product but such products are inferior with respect to uniformity of fiber diameter, weight distribution, and freedom from shot, twinning and roping, and are incapable of making media with average fiber diameters below about 3 to 5 µm.

By changing orientation, location, and geometry of the crossed stream fiberizers, changing resin flow rate, air flow rate, and temperature, and using nozzles with larger or smaller orifices, media can be made which as taken off of the machine have an average fiber diameter from less than 1 µm to more than about 20 to 50 µm, with a range of voids volumes from about 60% to about 94% and a range of thicknesses from less than 0.008 cm to 0.5 cm or more, all with good tensile properties, controlled pore size, thickness, fiber orientation, and voids volume. When used as filters, so made media provide particle removal ratings as measured by the OSU (Oklahoma State University) test from 1 µm to 200 µm or more. Long life in service is obtained using these media due to their high voids volume and resistance to compression as the collected solids cause pressure to build up across the filter.

Referring to FIG. 6A, the locations of the fiberizing nozzles is preferred to be such that the distance N—N between the nozzle tips is in the range from about 0.5 to 3 cm, and more preferred to be in the range of about 1 to 2 cm, and still more preferred to be in the range of about 1.2 to 1.6 cm, and it is preferred that the angle $\theta$ between the nozzle and the vertical plumb line from the center of the collector cylinder be within about 5° or less of equal but of opposite direction for both dies, and it is further preferred that the angle $\theta$ be in the range of about 3° to 25°, and more preferred to be in the range of about 5° to 20°, and still more preferred to be in the range of about 10° to 16°. The volume and type of fibers issuing from each side is usually preferred to be equal; however, products of interest for special purposes may be made by operating each side using different conditions, for example to combine high mechanical strength with very small fiber diameter.

The deposited porous medium may be slit lengthwise, removed, and flattened, for use for example as a component of a diagnostic device, or as a filter, or it may be calendered to reduce its pore diameter to provide a filter medium with an absolute removal rating of less than 0.5 µm as measured by the methods described in U.S. Pat. No. 4,340,479.

The collector cylinder 64 of FIGS. 6A and 6C may be surfaced by a suitable release coating. Depending on the thickness, voids volume, and other characteristics of the porous medium, a tubular cylinder of porous medium may then be withdrawn from the collector cylinder and used for example as a filter with the flow from inside to out, or it may be pleated to form a seamless pleated filter element.

The crossed fiber stream arrangement of the invention is preferred to be used as the fiber generator with the scanning system of the invention because it permits high translation rates together with high fiber deposition rates while minimizing fiber loss due to overspray, and, because unlike arrays in which the nozzles are parallel, it can be used to make very uniform fibrous products with a very wide range of characteristics with precise lot to lot reproducibility. The media so made are uniform within the sensitivity of the tests which can be applied, such as weight per unit of area, thickness, voids volume, pore size, wicking rate, and particle removal capability.

The processes of the invention can be used to prepare fibrous porous media of a wide variety of materials and have been used to prepare fibrous porous media of polybutylene terephthalate (PBT), polypropylene, polyethylene, polymethylpentene, polychlorotrifluoroethylene, polyphenyl sulfide, poly(1,4-cyclohexylene dimethylene terephthalate), PETG, a polyester polymerized with an excess of glycol, nylon 6, nylon 66, nylon 612, nylon 11, and a nylon 6 copolymer described as "80% nylon 6 with 20% polyethylene-oxide-diamine."

Referring again to FIG. 6A, a useful mode of operation is achieved by attaching at connection 63 means to generate within chamber 62 a negative pressure in the range from zero to about 3" of water column, thereby achieving a more uniform product (as may be seen in example 44). Further, the cylinder, thereby forming a sheet 47.5 cm wide by 102 cm long.

The air pressure and the DCD were then varied to produce five additional sheets with results as presented as examples 1–6 in Table I. All of the so formed sheets were examined on a light box, and were seen to be stripe-free and uniform. The sheets were very easy to manipulate, and could be stacked and removed repeatedly with no pilling or other visible surface disruption. No dimensional changes occurred during a three month storage period in a mixed stack of 24 sheets. This degree of dimensional stability is quite remarkable for a plastic product in some of which the solids content is as low as 8% by volume, with the remainder being air.

TABLE I

| | Test Conditions | | | Product Characteristics | | | | | |
|---|---|---|---|---|---|---|---|---|---|
| | Air | | | | Average | | | | |
| | | | | Voids | Fiber | Tensile Properties | | | |
| Example | pressure | DCD | Thickness | Volume | Diameter | Strength (glc)[1] | | Elongation (%) | |
| No. | (kg/cm$^2$) | (cm) | (cm) | (%) | (μm) | CMD[2] | MD[3] | CMD | MD |
| 1 | 0.39 | 4.1 | 0.0185 | 82.5 | 4.2 | 230 | 90 | 5.0 | 5.0 |
| 2 | 0.79 | 4.1 | 0.029 | 89 | 1.1 | 510 | 130 | 9.7 | 14.7 |
| 3 | 1.06 | 4.1 | 0.054 | 94 | 1.0 | 440 | 110 | 8.5 | 13.5 |
| 4 | 1.06 | 3.6 | 0.042 | 92 | 0.9 | 500 | 150 | 8.0 | 13.2 |
| 5 | 1.06 | 3.0 | 0.027 | 88 | 1.0 | 440 | 200 | 6.8 | 11.3 |
| 6 | 1.06 | 2.8 | 0.021 | 84.2 | 1.2 | 390 | 240 | 6.0 | 84 |

[1]grams per linear centimeter.
[2]cross machine direction - perpendicular to the length of the sheet
[3]machine direction - parallel to the length of the sheet while it is an advantage of the crossed fiber stream system that both sets of fiber streams impinge on the collector cylinder on or close to a straight line, thus helping to minimize fibers which are not collected, nevertheless, when operating at relatively high air flow rates, the volume of air reaching the cylinder may be so high that some of the fibers bypass the collector cylinder, and are lost into the exhaust duct. Negative pressure applied to chamber 62 acts to prevent or diminish bypassing and to reduce loss of fibers to waste.

EXAMPLES 1–6

In order to prepare the porous medium of example 1, the scanning system of the invention was operated with a fiberizer assembly comprising two fiberizers each with 21 fiberizing nozzles with air apertures 0.13 cm in diameter supplied with air at 304° C. and 0.39 kg/cm$^2$ pressure. The two fiberizers, each with 21 nozzles on 0.76 cm centers were offset axially from each other by 0.38 cm, and were angled towards each other at an inclination of 13° from the vertical, with the distance N—N of FIG. 6B set at 1.42 cm. The two sets of intersecting fiber streams delivered polybutylene terephthalate (hereinafter PBT) resin at 293° C. at the rate of 0.44 grams per minute per nozzle. The fiber streams impinged over a distance of 4.1 cm (i.e., DCD=4.1 cm) on a 15 cm diameter by 137 cm long collection cylinder which was rotated at 512 rpm while it was simultaneously translated axially at the rate of 0.2 cm per revolution for the length of a single 124 cm stroke, thereby depositing on the surface of the collector cylinder in 1.2 minutes 0.0043 grams per cm$^2$ of fibrous porous medium which was then slit lengthwise, trimmed at both ends, and then removed from All of the examples 1 to 6 exhibit the low lateral flow times which are a desirable feature of the invention. Examples 3, 4 and 5 have RMS average fiber diameters respectively of 1.0, 0.9 and 1.0 μm (arithmetic averages 0.9, 0.8 and 0.9 μm), and are believed to be smaller in average fiber diameter compared with any melt-blown product currently or previously commercially available. Examples 5 and 6 are distinguished by their capability to remove very fine particles from liquid suspensions passed through them; using the F-2 test developed at Oklahoma State University (OSU) and since adopted as a standard by a wide range of industries dealing with liquids such as fuels, lubricating oils, and liquid food products, the media of example 6 have been shown to remove particles larger than one micrometer in diameter in a single pass at low pressure drop with long service life and particle removal efficiency in excess of 99.9%.

All of the six examples have substantially higher tensile strength in the cross machine direction (i.e., perpendicular to the long (102 cm) direction of the sheet, hereinafter referred to as the CMD), compared with their tensile strength in the machine direction (MD); for examples 2, 3, and 4 the ratio of the tensile strength is approximately 4:1. This reflects the degree of directional orientation of the fibers. An example of a more highly directional medium made using the procedures of the present invention may be seen in the SEM photo of FIG. 7.

The data of Table I were obtained using a single pass across the collection cylinder; however, multiple passes may be used by reciprocating the collection cylinder to the end of its stroke and back, often to advantage, for example when collecting thick webs, where the use of multiple passes provides the ability to adjust the DCD to allow for the thickness of the medium collected. In this way webs, or perhaps more properly battings, of uniform structure up to one or more centimeters in thickness may be made.

EXAMPLE 7

In order to prepare the porous medium of example 7, the scanning system of the invention was operated with a fiberizer assembly comprising two fiberizers each with 21 fiberizing nozzles with air apertures 0.106 cm in diameter supplied with air at 332° C. and 0.74 kg/cm² pressure. The two fiberizers, each with 21 nozzles on 0.76 cm centers were offset axially from each other by 0.38 cm, and were angled towards each other at an inclination of 13° from the vertical, with the distance N—N of FIG. 6A set at 1.42 cm, and the DCD (die to collector distance)=3.3 cm. The two sets of intersecting fiber streams were supplied with 318° C. polypropylene resin at the rate of 0.134 grams per minute per nozzle. The fiber streams impinged on a 15 cm diameter by 137 cm long collector cylinder which was rotated at 175 rpm while it was simultaneously translated axially at the rate of 0.11 cm per revolution for the length of a single 125 cm stroke, thereby depositing on the surface of the collector cylinder in 6.5 minutes 0.054 g/cm² of fibrous porous medium, which was then slit lengthwise, trimmed at both ends, and removed from the cylinder, forming a sheet 47.5 cm wide by 102 cm long. The so produced 0.0054 g/cm² sheet was 0.056 cm thick and had a voids volume of 89%, a linear average fiber diameter of 0.8 micrometers, and a root mean square diameter of 0.9 μm (hereinafter all average diameters will be reported as root mean square (RMS) diameters).

Figure 7:
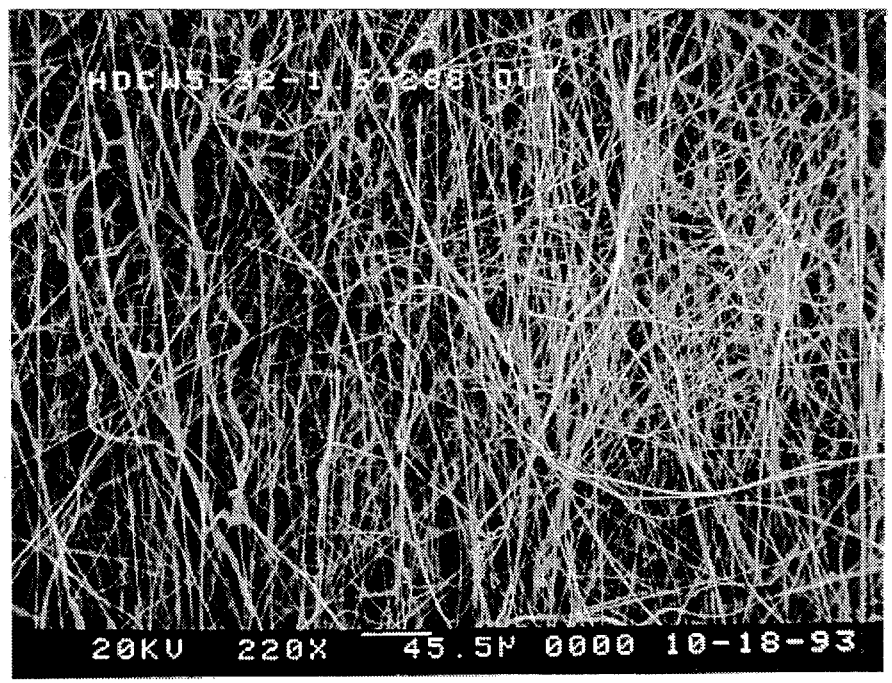
FIG. 7 is a scanning electron micrograph (220×) of a melt-blown fibrous nonwoven web prepared in accordance with the present invention.

A scanning electron micrograph of the product at 220× is shown in FIG. 7, in which the machine direction is horizontal. The fibers are predominantly oriented about equally to the left and right of vertical in the cross machine direction, each making an approximate angle of 10° to 15° to the vertical. Also notable in FIG. 7 is the relative absence of roping, twinning, and shot which characterize hitherto made melt-blown media.

Tensile tests were run with the following results:

|  | MD | CMD |
| --- | --- | --- |
| Tensile Strength, kg/linear cm: | 1.67 | 7.5 |
| Elongation, %: | 49 | 12 |

The ratio for the CMD/MD of tensile strengths is 4.5, reflecting the fiber orientation seen in FIG. 7.

EXAMPLE 8

A sheet of PBT resin was prepared in the manner of example 3 of the invention. Specimens were cut to 0.5×7 cm, five each in the MD and the CMD. Each of the ten specimens was then dipped into water at one end to a depth of about 0.3 cm, and the time was observed for the water to rise 2 cm. The average machine direction time was 15.9 seconds, and the average time in the cross machine direction was 9.6 seconds. These data reflect the fiber orientation of the sheet; the rate of capillary diffusion is greater in the CMD, which is the predominant direction of fiber orientation.

EXAMPLES 9–16

The apparatus of example 7 and procedures similar to those of example 7 were used with polypropylene resin to prepare examples 9–16. The machine settings and the resulting average fiber diameters are presented in Table II. The sheet weight was the same for all of the examples, namely 0.043 g/cm². The fiber diameters varied from 1.4 to 15 μm. All the products were uniform on light box inspection.

TABLE II

| Example No. | Resin Temp. (°C.) | Air Temp. (°C.) | Air Pressure (kg/cm²) | DCD (cm) | Mandrel (rpm) | Translation Rate (cm/rev) | Resin Rate (g/min/ nozzle) | Thickness (cm) | Voids Volume (%) | Average Fiber Diameter (μm) |
| --- | --- | --- | --- | --- | --- | --- | --- | --- | --- | --- |
| 9 | 318 | 335 | 1.54 | 3.8 | 260 | 0.17 | 0.22 | 0.31 | 84.6 | 1.4 |
| 10 | 318 | 335 | 0.98 | 4.1 | 260 | 0.18 | 0.23 | 0.24 | 80.1 | 1.9 |
| 11 | 318 | 335 | 0.63 | 4.1 | 260 | 0.18 | 0.23 | 0.22 | 78.2 | 2.2 |
| 12 | 318 | 335 | 0.53 | 4.1 | 260 | 0.18 | 0.23 | 0.21 | 77.2 | 3.4 |
| 13 | 313 | 321 | 0.42 | 7.6 | 230 | 0.29 | 0.33 | 0.31 | 84.6 | 5.2 |
| 14 | 313 | 329 | 0.32 | 7.6 | 230 | 0.29 | 0.33 | 0.31 | 84.6 | 7.9 |
| 15 | 313 | 329 | 0.21 | 7.6 | 230 | 0.29 | 0.33 | 0.31 | 84.6 | 10.6 |
| 16 | 313 | 329 | 0.18 | 7.6 | 415 | 0.31 | 0.63 | 0.27 | 82.3 | 15.1 |

Evaluation of Fiber Diameter

Many of the applications of fibrous porous media are made possible or are better served if the diameters of the fibers are small. For example, filters used to provide optically clear fluids, or to remove bacteria or particles in the micrometer range, will have lower pressure drop and longer life in service if made using smaller fibers, and filters made for use in processing transfused blood and blood products in the manner of U.S. Pat. Nos. 4,880,548 and 4,925,572 can be made smaller in size, hence have smaller internal hold-up volumes while retaining equal or better removal efficiency, thus delivering a larger proportion of the blood to the patient, or they can be made more efficient with no increase in blood hold-up volume within the filter.

The specimens of commercially available melt-blown media which have been examined have all had fiber diameter distributions such that the ratio of the largest diameter to the smallest is greater than ten. Using optical or scanning electron microscopy to accurately determine the average fiber diameter of such media is extremely difficult, if not impossible. Counting fibers by identifying individual fibers and measuring their diameter is easy when the range is small, for example when the largest fiber is less than about two to four times the diameter of the smallest; however, it is very difficult when the range is ten or more to one. In typical commercially available media, the same fibers run off the photo and then perhaps back on again, or down into the depths below the focal depth of an optical or scanning electron microscope and then perhaps up again. For these reasons, estimates of fiber diameter made by conventional melt-blowing have stated a range, for example 1 to 10 μm. In such a report a single 10 μm diameter fiber should be assigned a weight for averaging purposes 100 times that of a 1 μm fiber, and thus the sighting of one or two 1 μm diameter fibers has little impact.

In practice, it has been easy to make a product "containing 1 μm fibers", but the average diameter of all of the fibers has been many times larger, for example 5 or more times the diameter of the smallest fiber. The products of the present invention have fiber diameter ranges which are less than one third those of conventional media, permitting average fiber diameters to be determined with a precision estimated to be about ±5% by measuring the diameters of 100 fibers.

The evaluation of the mean diameter of fibers as reported herein has unless otherwise noted been accomplished using scanning electron microscopy to determine the diameter of at least 100 fibers using several fields, each of which typically contained about 20 to 30 fibers. Each fiber counted was identified and its diameter noted on the photo. Where necessary to establish the diameters of the finest fibers, magnifications of up to 2000× were used. Averages were computed as the root mean square (RMS), i.e., $$\text{RMS average diameter} = \left( \frac{\Sigma nd^2}{\Sigma n} \right)^{1/2}$$

wherein n is the number of fibers and d is the individual fiber diameter. This formula takes into account the greater contribution to weight and surface area by the larger diameter fibers. The arithmetic average, $\Sigma nd/\Sigma n$, hereinafter referenced as the average fiber diameter, is about 10% lower.

Fiber surface areas were when required calculated as $$\text{Surface area, m}^2/g = \frac{4}{\text{RMS diameter, μm} \times \rho}$$

where ρ is the density in g/cc of the resin of which the fibers are composed.

Using this method for the evaluation of fiber diameter the procedure of the invention is capable of manufacturing PBT (polybutylene terephthalate) and polypropylene media with RMS average fiber diameters of about 1 μm or less, as is shown by examples 3, 4, 5 and 7. At the other end of the scale, uniform media comprising 30 μm and larger diameter fibers have been made.

A survey of manufacturers of melt-blown fiber in the U.S.A., Europe, Asia, and the Americas turned up thirteen manufacturers who offer melt-blown web for public sale. A sample of the smallest diameter fiber produced was requested from each, a request to which nine responded. Those samples which claimed to have average fiber diameter of 3 μm or less were evaluated by using gas adsorption at 80° C. (the BET method) and calculating the average fiber diameter. None were smaller in average fiber diameter than 1.8 μm, and most were larger than 3 μm.

Evaluation of the Voids Volume

The data required to determine voids volume include the weight of the sheet per unit area, the density of the fiber, and the thickness of the sheet. Measurement of thickness is not straightforward because the media are compressible, which can cause large errors if inappropriate equipment is used. In the invention, thickness gauges were used in which a 7.62 cm diameter aluminum foot is attached to a gauge with 0.0001 inch (0.00025 cm) graduations. The gauge with its foot is mounted on a horizontal U shaped frame comprising on its lower arm a flat surface against which the foot rests. The gauge foot was actuated downward by a 60 gram force spring, which together with the 80 gram weight of the foot exert a compressive force on the test specimen of 140 grams, or 3.1 g/cm². This force compresses even the loftiest and most easily compressed of the media of the invention by less than about 1%.

The voids volume was then calculated in % as $$\% \text{ voids} = (t - W/\rho)t^{-1} \times 100$$

where t=thickness (cm), W=weight (g/cm²), and ρ=density of the fiber (g/cc).

Protein Binding By Porous Media

In diagnostic applications the liquid sample to be tested is placed at one end of a porous strip through which it diffuses laterally. The diagnostic device may be constructed such that the moving liquid dislodges preplaced particles, which may be of submicroscopic dimensions and may have been attached to or coated by an enzyme, an antigen or an antibody, with the particles then being carried along by the flow of the liquid. It is often desired that the contents of the flowing liquid, be they solid particles in suspension or true solutions, should not be removed by adsorption on the fiber surfaces through which they pass.

In many or most, if not all, cases the dissolved material and/or the coating on the particles is proteinaceous at least in part. The adsorption of Bovine Serum Albumin has been widely used as a screening test, i.e., a test to determine whether a given porous medium is more likely or less likely to adsorb proteins from solution or to hold back suspended particles, such as might be caused by adsorption of proteins attached to the particle surfaces.

In the present invention, protein binding was determined using a radioactive assay in which 2.5 ml of a BSA solution containing 250,000 cpm of $^{125}$I BSA in a total of 250 μg of BSA in 10 mM phosphate buffer of pH 7 and 0.1M NaCl is pumped at the rate of 0.5 ml per minute through a 13 mm disc of the porous medium to be tested. The disc is then removed from the holder and analyzed for bound radioactivity in a gamma counter, from which the total amount of protein adsorbed is then calculated.

Diagnostic Devices

Nylon membrane produced in accordance with U.S. Pat. No. 4,340,479 has seen extensive use for filtration, and in addition the 5 μm absolute removal grade has been widely used in recent years as a component of devices used for medical diagnostics, for example in devices which indicate pregnancy when contacted by a specimen of urine, or which measure the level of cholesterol in blood. In these and other diagnostic devices, a porous medium, which may be referred to as a substrate, is often required to serve as a part or as all of the structure of the device. In the following paragraphs a structure is described which while only one of many variations, is representative of many commercially used types of devices.

The purchaser of the diagnostic device, who may be an individual, a medical doctor, a veterinary doctor, a medical laboratory, or a hospital, generally uses the device by applying a specimen, for example of urine, saliva, blood or blood plasma, or other body fluid to a designated portion at one end of the substrate. The specimen is rapidly absorbed into the substrate and then is caused by the capillarity of the substrate to diffuse or flow laterally through the substrate. The substrate may contain insoluble particles which have been preplaced by the device manufacturer, and may contain as well soluble reagent(s) similarly preplaced in order to hold the reagent(s) in place. The preplaced particles, which may be attached to the fibers of the substrate by an inert binder such as sucrose, are picked up by the diffusing test fluid together with any soluble reagent(s), which then together with the reacted specimen diffuse further laterally to a "capture zone" at which the mixture may be immobilized by yet another reagent or by the configuration of the substrate. In the capture zone, the reacted product may be appraised visually, for example by a change in color as in a simple pregnancy test, or it may be evaluated spectroscopically in or out of the visible range, or it may be evaluated by a change in pH or electrical conductivity, among other means.

The time required for the test fluid to diffuse through the substrate from the area at which the test specimen is deposited to the capture zone is known as the lateral flow time, or LFT. The LFT is critical to the functioning of the device; for example it should not be so small so as to fail to dissolve a preplaced reagent, and consistent with the dissolution time or similar requirements it should be as small as possible in order to allow the user of the test to reach a conclusion as quickly as possible.

Nylon membranes have been used as substrates for lateral flow in a variety of such devices, of which large numbers have been sold annually; however, in the recent period many requests have been received from manufacturers of the devices seeking a porous medium which transfers liquids laterally more rapidly, i.e., one which has a smaller LFT than has been obtained using nylon membrane. A nitrocellulose membrane which also has an LFT too high for most applications has been commercially available as an alternative to the 5 μm nylon membrane of the U.S. Pat. No. 4,340,479. These two products are believed to have dominated the market for porous media used by device manufacturers as substrates in the construction of diagnostic devices. The nitrocellulose membrane is not inherently hydrophilic, and for this reason it is impregnated by the manufacturer with a surface active agent, without which it would not be wetted by and thus penetrate into the specimens to be analyzed. The presence of the surface active agent has been characterized as very undesirable by manufacturers of diagnostic devices because it dissolves in the test sample and may change its behavior. However, nitrocellulose has nevertheless been used in some applications because its LFT, while still often higher than desired by the diagnostics industry, is lower than the LFT of nylon membrane.

The constructions used for diagnostic devices which employ porous media have in the past been limited by the availability of porous media with the desired characteristics. An objective of the invention is to provide a very wide range of porous media for use in these devices.

An important property of porous media which is not widely understood is Critical Wetting Surface Tension, or CWST. CWST is described in U.S. Pat. No. 4,880,548. Wettability of porous media had not been previously described for liquids having surface tension above 73 dynes/cm (the surface tension of water). That the behavior of porous media with CWST values above 73 dynes/cm has important effects was first established by the '548 patent, which demonstrated that it is necessary that a porous medium have a CWST above about 95 dynes/cm in order to retain harmful white cells and freely pass the beneficial platelets while processing human blood plasma containing platelets and white cells. The CWST of a porous medium is defined in the '548 patent as equal to the average of the surface tensions of two liquids of which one is absorbed when a drop of the liquid is applied to the surface of the porous medium, while a drop of slightly higher surface tension liquid, for example two dynes/cm higher, will not be absorbed.

It has been discovered that the CWST of a porous medium has significant effects on behavior when used with liquids of surface tension below the CWST of the porous medium.

The various products of the present invention, whether of polyester, polypropylene, or other resin may not be hydrophilic as made, and for applications such as diagnostic substrates they must be converted to the hydrophilic state, which is defined as the condition in which their CWST exceeds 73 dynes/cm, which is the surface tension of water.

Unless otherwise stated PBT media were hydrophilized prior to use in the examples of the invention by the conventional means of exposure to Oxygen plasma; however, the Oxygen plasma process is not a true graft, and unless the so made products are packaged to prevent exposure to ambient atmosphere, they may have unsatisfactory shelf life. Consequently other means have been sought and developed to modify fiber surfaces to obtain a true graft which would assure a stable product, e.g., one not requiring special storage conditions. The grafting process described below is based on known principles, but is believed to be novel with respect to its use for making stable diagnostic substrates, and there does not appear to have been any prior disclosure of a grafting system with a total time to presentation of the dry grafted product in less than about three minutes, nor of one which takes place completely in the gas phase.

In this novel grafting procedure, the CWST is raised to above 73 dynes/cm by a two or three step process comprising (a) exposing the porous medium for about 10 to 30 seconds to a plasma of an inert gas, such as Helium, Neon, or Argon at about 20 to 700 μm Hg, (b) optionally evacuating the chamber to a pressure of less than about 5 μm of Hg, and then (c) introducing into the chamber liquid hydroxypropyl methacrylate or other unsaturated monomer presenting a hydroxyl group and holding for a period of about 30 seconds or more. After filling the chamber with air, the grafted polymer, now ready to use, may be removed. Weight gain depends on the surface area of the porous medium. A typical value is in the range of up to about 5 to 10%. Temperature during the operation remains essentially at the ambient. Preferred monomers include hydroxypropyl acrylate (HPA) and hydroxy ethyl methacrylate (HEMA), along with other similarly functional monomers which are known to those familiar with the art of grafting. In a variation of the above described procedure the unsaturated monomer may be used to form a plasma in step (a) in place of the inert gas, with similar end results.

A remarkable feature of the invention is that, unlike other grafting procedures known to those familiar with the art, the CWST produced with HPA and HEMA is 74 to 76 dynes/cm over a wide range of concentrations and times of exposure when used to treat hydrophobic polyester substrates. Other resins can be similarly converted to form fibrous porous media and then hydrophilized as described above.

Other means to achieve a permanent graft include cobalt 80 irradiation, UV exposure, or electron beam, in each case followed by exposure to an aqueous solution of a suitable monomer, which could for example be an acrylic alcohol, which must then be followed by washing and drying.

The CWST of porous media used as substrates in diagnostic devices has an important effect on lateral flow time. Lateral flow time tends to be shortest at CWST values above about 100 dynes/cm and are for example longer in substrates of exactly equal physical structure which have CWST's in the 70 to 80 dyne/cm range. Where applications require longer lateral flow times these may be obtained in a given substrate by reducing the CWST of the substrate with no alteration of pore size or voids volume; however, other methods for altering lateral flow times described below are easier to control, and may for that reason be preferred.

In order to measure the lateral diffusion rate of the products of the invention a test procedure was developed which simulates the lateral diffusion of the test liquid in commonly used tests: A suspension of blue dyed polystyrene spheres in water was obtained from Bangs Laboratories, Carmel, Ind., specified as "uniform latex dyed microspheres, color=Blue A1, polystyrene, mean diameter=0.3 μm". Prior to use in the test, the concentration of the microspheres was reduced to 0.04% by adding one part of the suspension to 250 parts of water.

Figure 8:
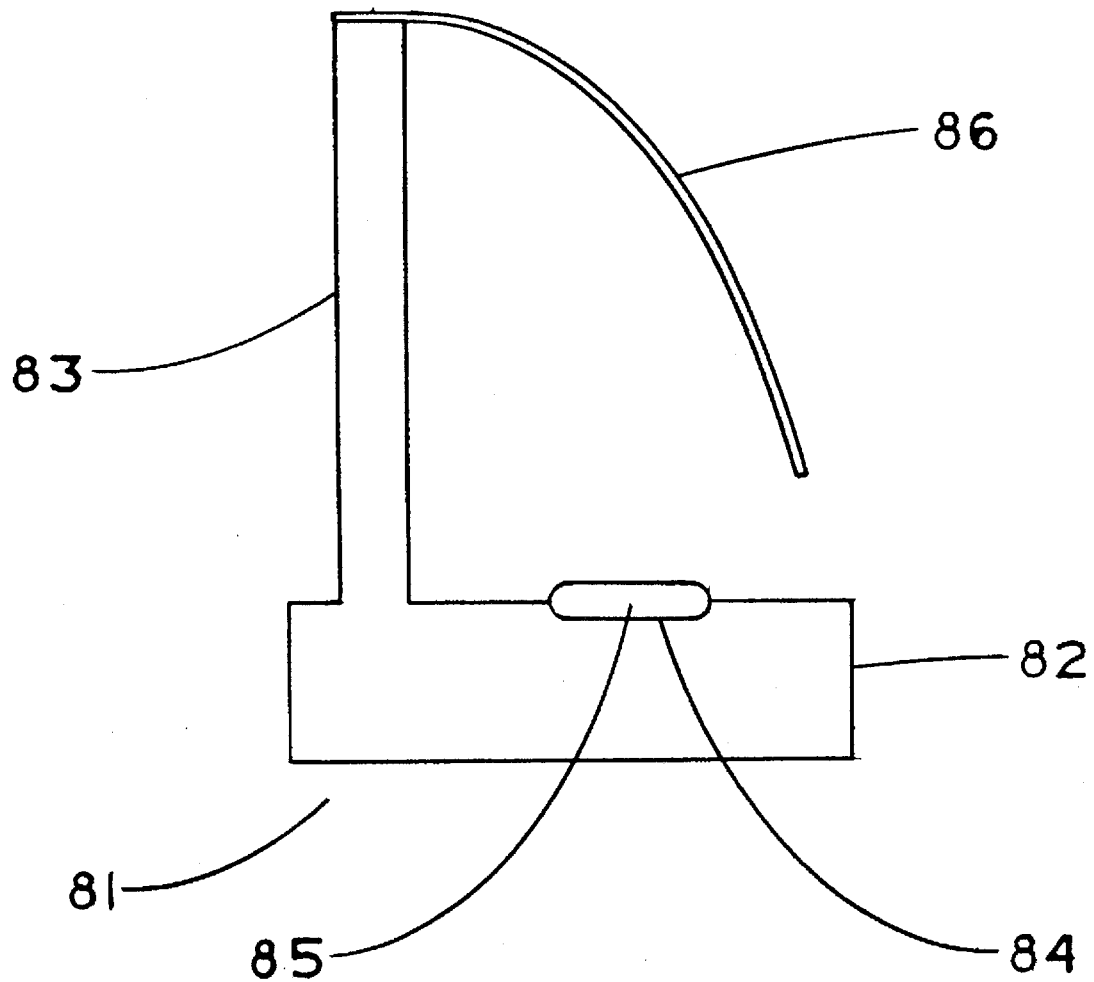
FIG. 8 is an elevation view of an apparatus to measure lateral flow times of materials such as the melt-blown fibrous nonwoven web prepared in accordance with the present invention.

To perform the test, an apparatus generally in conformance with FIG. 8 is provided. FIG. 8 is an elevation view of a transparent plastic test device 81 comprising a platform 82, an upright post 83, and a shallow cavity 84. Two hundred microliters of the test suspension is placed in cavity 84, thereby forming pool 85. A test strip 86 is cut to 0.5×7 cm from the porous medium to be tested, and marked near one edge at 1, 3, and 5 cm from one end. The unmarked end of the test strip is then fastened to the top of post 83, thus cantilevering the marked end in the air above platform 82. Using tweezers, the cantilevered end of the test strip 86 is dipped into the center of pool 85, in which it is retained by capillarity, and the times are measured for the advancing front(s) to travel 2 cm, from the 1 cm to the 3 cm mark, and the time to travel 4 cm, from the 1 cm mark to the 5 cm mark.

Depending on the nature of the substrate, the blue spheres may advance coincidentally with the liquid front, or the blue spheres may be retarded, in which case a separate blue front is observed, and there is a gap between the blue front and the liquid front. If the blue spheres have reached the 4 cm mark at the same time as the liquid (i.e., the advancing fronts coincide) the "lag" is recorded as zero; if the blue spheres lag behind and have not fully advanced, the magnitude of the lag at 4 cm is recorded accordingly. A lag of more than about 1 mm is undesirable, and a zero lag is highly preferred for proper functioning of a diagnostic test.

EXAMPLES 17-24

The media of examples 1 to 6 were Oxygen plasma treated to modify their surfaces, after which their CWST was 100 dynes/cm. Strips were then cut from each of the samples and subjected to the lateral flow test described above; the results are presented in Table III. All of the specimens had zero lag, and all of the lateral flow times tend to be at the low end of the range required for use in diagnostic devices. For comparison purposes, 12 μm pore size nitrocellulose and 5 μm pore size nylon membrane specimens were tested in a similar manner and were shown to have very much longer lateral flow times.

TABLE III

| Example No. | Specimen cut from Example No. | Lateral flow time (sec) 2 cm CMD | 2 cm MD | 4 cm CMD | 4 cm MD | Lag at 4 cm mark (mm) CMD | MD |
|---|---|---|---|---|---|---|---|
| 17 | 1 | 7.2 | 10.0 | 25.8 | 37.2 | 0 | 0 |
| 18 | 2 | 10.8 | 12.6 | 35.0 | 45.6 | 0 | 0 |
| 19 | 3 | 11 | 15 | 40.4 | 54.0 | 0 | 0 |
| 20 | 4 | 11.4 | 15.8 | 39.6 | 57.4 | 0 | 0 |
| 21 | 5 | 14.2 | 19.8 | 49.2 | 68.8 | 0 | 0 |
| 22 | 6 | 16.0 | 22.0 | 58.2 | 75.0 | 0 | 0 |
| 23 | NITROCELLULOSE 12 μm | 80 | | >240 | | 0 | |
| 24 | NYLON 5 μm | 96 | | >240 | | 4 | |

The MD lateral flow times are 17 to 45% higher compared with the CMD times, reflecting the orientation of the fibers. In the CMD tests the test suspension flows at small angle, i.e. closer to parallel to the fiber direction, hence faster liquid flow is obtained, along with no detectable interference with the passage of the microspheres. In the MD tests, the liquid flow is obstructed by the fibers across which they must flow because the fibers are near to perpendicular to the flow direction, hence the LFT's are longer.

The hydrodynamics of liquid suspensions are such that when the flow is parallel or near to parallel to an adjacent surface, the particles move away from the surface, and as a consequence the probability of a particle being adsorbed on the surface is reduced. Contrasted with this, flow at or near to perpendicular to fiber orientation increases the probability of collision and adsorption. For these reasons, a near to parallel orientation is preferred when minimum adhesion of particles is desired. When adsorption is desired, for example in the capture zone, or to remove an undesired component of the sample, it may be accomplished or assisted by using the substrate with flow in the machine direction. Beyond these advantages there is a convenience factor for the user who has a single grade of medium with two LFT times at his disposal.

EXAMPLE 25

The porous media of the invention have been made with voids volume varying from about 60% to about 96%. Higher voids volumes are obtained by using relatively lower feed rates of the molten resin, together with a higher DCD; conversely to obtain lower voids volumes (i.e., higher density) the DCD is reduced and resin rate increased.

Figure 9:
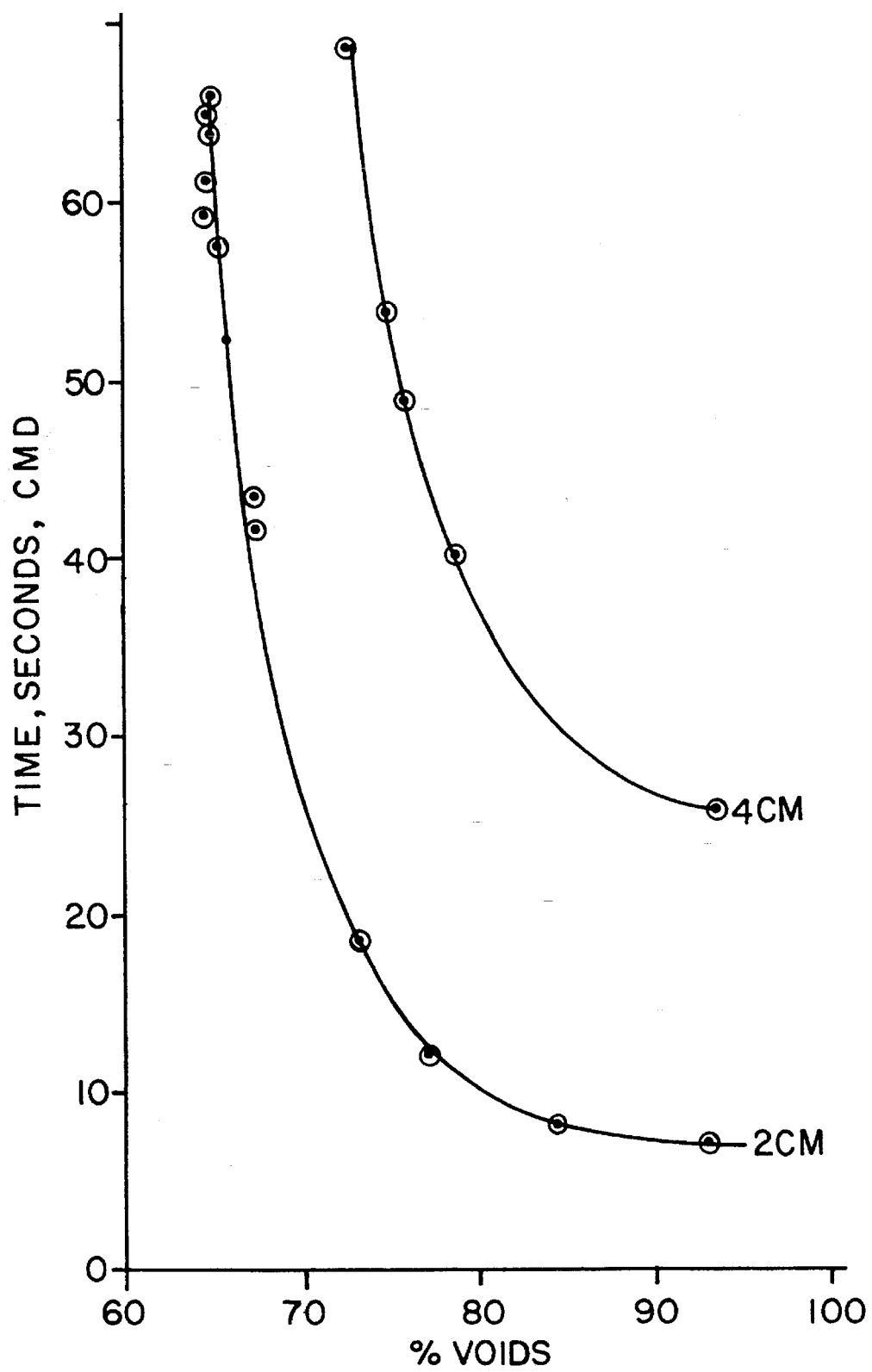
FIG. 9 is a graph depicting the lateral flow times (sec) in the cross-machine direction versus % voids volume for melt-blown fibrous nonwoven webs prepared in accordance with the present invention.

In order to obtain a range of lateral flow times, a series of PBT media were prepared in which the voids volume was varied from 65% to 93%, adjusting conditions such that the average fiber diameter for all the specimens was in the range of about 6 to 10 μm, CWST was 100 to 110 dynes/cm, and the sheet weight was 0.0053 g/cm$^2$. The results are shown graphically in FIG. 9, which shows well controlled LFT's varying from to 64 seconds for the 2 cm span. The corresponding values for the 4 cm span range from 26 seconds to above 70 seconds. All of the measurements showed zero lag.

EXAMPLES 26-30

Another means for modifying the LFT of a porous medium is to reduce its voids volume by reducing its thickness, for example by calendering. Except for use of a smaller DCD, example 26 was prepared in the manner used to prepare example 2. Portions of example 26 were then calendered to reduce thickness and voids volume, followed by Oxygen plasma treatment, producing examples 26–30, for which the LFT data are shown in Table IV.

TABLE IV

| Example No. | Thickness (cm) | Voids Volume (%) | Lateral Flow (sec) CMD 2 cm | CMD 4 cm | MD 2 cm | MD 4 cm | Bead Front Lag at 4 cm (cm) |
|---|---|---|---|---|---|---|---|
| 26 | 0.026 | 84.8 | 9 | 41 | 11.5 | 56 | 0 |
| 27 | 0.019 | 79.2 | 12 | 51 | 14.5 | 64 | 0 |
| 28 | 0.015 | 74.4 | 18 | 75 | 22.5 | 102 | 0 |
| 29 | 0.0115 | 65.1 | 27 | 109 | 27.5 | 151 | 0 |
| 30 | 0.0100 | 60.6 | 32 | 173 | 37.5 | 227 | 0 |

No lag was observed during the LFT tests. These LFT's cover the range expected to be most useful in the manufacture of diagnostic devices. The very smooth surfaces, increased toughness, and resistance to abrasion developed by calendering contribute to ease of automation for production and may be preferred for cosmetic reasons.

EXAMPLE 31

A set similar in function to that of examples 26–30 is prepared with fiber diameter as the variable and voids volume and CWST being held constant. The specimens with finer fiber have higher lateral flow times, thereby enabling a plot of LFT as a function of fiber diameter to be prepared, which would be useful in the preparation of a medium with a desired LFT.

EXAMPLE 32

A set similar in function to that of examples 26–30 is prepared using a single grade of porous medium, of which specimens are prepared with varying CWST over the range from 73 dynes to 110 dynes/cm. The lateral flow times range from about 10 seconds at CWST>100 to over 25 seconds at CWST=73 dynes/cm. The resulting LFT data may then be plotted against CWST, enabling a medium with a desired LFT to be made.

EXAMPLE 33

A substrate prepared in the manner of example 2 was cut to 23×25 cm and hung from a fluorocarbon rod in the center of a 50 liter chamber equipped with two 27×30 cm electrodes spaced about 25 cm apart. After evacuation to less than 5 µm of Hg pressure, Helium was passed into the chamber at a rate sufficient to maintain a pressure of 110 µm Hg within the chamber while vacuum pumping was continued. A plasma was formed by applying to the electrodes 500 watts of power at 13.56 megahertz for 30 seconds, at which time the helium flow was reduced to zero and the power was turned off while vacuum pumping was continued until the pressure dropped to 3 µm Hg, at which time the vacuum valve was closed and 2 cc of liquid hydroxypropylmethacrylate (HPA) monomer was metered into the chamber. The pressure within the chamber then rapidly increased to about 200 µm Hg, and during the next 3 minutes rose to about 450 µm Hg. At the completion of a 3 minute exposure, the chamber was pumped down to under about 20 µm Hg, and air was allowed to enter the chamber raising the pressure to ambient, after which the chamber door was opened and the specimen was removed. Weight gain due to grafting was 5.9%. CWST tests on about 4.5 cm centers over the whole area revealed a uniform CWST of 76 dynes/cm, which thereafter remained stable. An LFT test was run on the specimen, producing CMD times of respectively 15 and 48 seconds for 2 and 4 cm, and MD times of 24 and 72 seconds for 2 and 4 cm, all with zero lag.

The above described grafting procedure was repeated with numerous variations including the use of Neon and Argon as the inert gas as well as by using the HPA itself to form the plasma, at pressures varying from about 30 to 600 µm, and with a wide range of exposure times to the inert plasma from about 10 to 120 seconds and to the monomer ranging from about 30 seconds to 5 minutes. Remarkably, unlike other grafting procedures, in which the results vary with the radiation intensity, reagent concentrations, and time of exposure, the products all had a uniform CWST after treatment of 74 to 76 dynes/cm over their whole area. Scale up to larger apparatus operating at a frequency of 40 KHz has processed 45×100 cm sheets with essentially equal results. Other acrylate monomers, such as for example methacrylic acid and N-vinylpyrrolidinone, have been proved to be effective in obtaining alternate CWST values, and the chemistry is believed to be such that compounds containing one or more accessible double bonds may be reacted to produce a variety of results.

EXAMPLE 34–35

PBT products of the invention were prepared using the procedure of examples 1 and 2, and the fiber surfaces were then modified to a CWST of 76 dynes/cm using the Helium plasma—HPA vapor exposure system of example 33. A portion of each of the two specimens was clamped into a 13 mm diameter filter holder, and a solution of bovine serum albumin (BSA) which had been radioactively labelled was passed through the filter, following which the level of radioactivity in the effluent was measured and the resulting data used to calculate the weight of protein adsorbed. The resulting data for the two specimens, example 34 and 35, are set forth in Table V.

TABLE V

| Example No. | Material | Processing | Weight of BSA bound by a 13 mm disc (µg) |
|---|---|---|---|
| 34 | Media of Example 1 | As made, off machine | 58 |
|  |  | Processed by procedure of example 33 | 2.7 |
| 35 | Media of Example 2 | As made, off machine | 59 |
|  |  | Processed as example 33 | 2.4 |

EXAMPLE 36

A sheet of 0.2 µm pore size nylon membrane made by the process of U.S. Pat. No. 4,340,479 was tested to determine its protein adsorption characteristics using the BSA test described above. A 9"×10" specimen cut from the same sheet was grafted using the procedure of example 33. The BSA adsorption prior to and after grafting were respectively 114 µg/cm$^2$ and 3.7 µg/cm; after a methanol wash water rinse and drying, the BSA of the after grafted specimen fell to 2.4 µg/cm$^2$.

EXAMPLES 37–40

A copolymer incorporating about 80% of nylon 6 with about 20% of polyethylene-oxide-diamine was used to prepare 50×100 cm sheets using the apparatus of and in the manner of example 1, at a resin rate of 0.61 grams per minute per nozzle at 344° C., with air supplied at 361° C. The DCD was 4.1 cm, and the air pressure was varied over the range 0.56 to 1.25 kg/cm$^2$ to produce media with average fiber diameters of 2.5 and 5.6 µm. In separate similar operations media of the same composition were prepared with average fiber diameters of 8.1 and 10.2 µm. The voids volumes of each of the four sheets was approximately 74%, and the CWST of all four sheets was 92 dynes/cm. The LFT values were determined and are shown in Table VI.

TABLE VI

| Example No. | Air Pressure (kg/cm²) | Thickness (cm) | Fiber Diameter (μm) | LFT (sec) CMD | MD |
|---|---|---|---|---|---|
| 37 | 1.25 | 0.030 | 2.5 | 20.6 | 31.2 |
| 38 | 1.16 | 0.019 | 5.6 | 19 | 26.6 |
| 39 | 0.81 | 0.019 | 8.1 | 17.6 | 23.4 |
| 40 | 0.56 | 0.020 | 10.2 | 15.2 | 18.4 |

Figure 10:
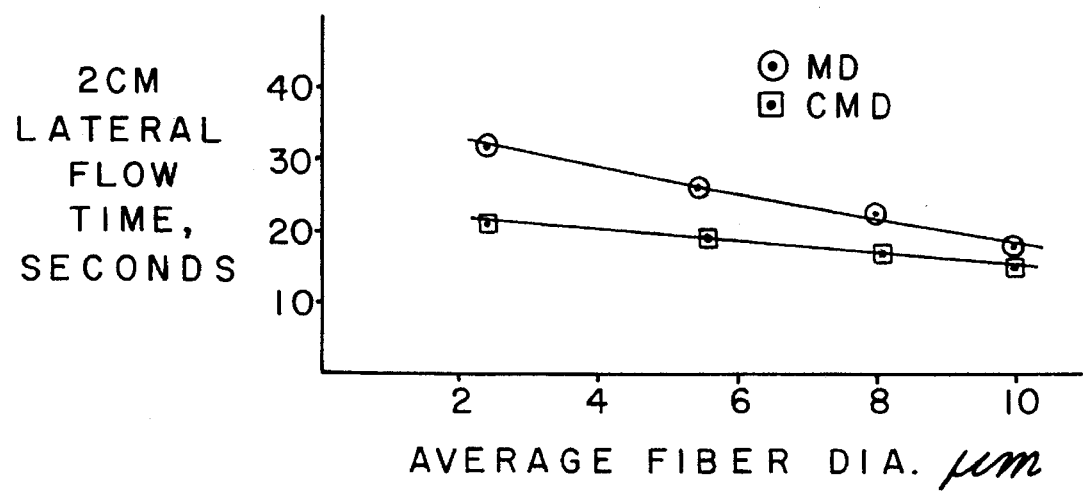
FIG. 10 is a graph depicting the lateral flow times (sec) in the machine direction (MD) and cross-machine direction (CMD) versus average fiber diameter for melt-blown fibrous nonwoven webs prepared in accordance with the present invention.

As illustrated by the data set forth in Table VI and FIG. 10, in both the CMD and MD, as the average fiber diameter is increased,, the LFT decreases in generally a linear fashion as shown in the plot of FIG. 10 of LFT versus average fiber diameter, which reflects the data of Table VI.

EXAMPLE 41

As measured by the BSA test the nylon copolymer of examples 37–40 has naturally low protein adsorption, with adsorption for a 13 mm disc ranging from about 8.3 μg for average fiber diameter 2.5 μm, to 1.2 mg for a specimen with average fiber diameter of 10.2 μm, values which are useful for many applications. In other applications, for example to fix the signal in the capture zone of a diagnostic device or to remove an undesirable component, higher protein adsorptions are preferred; for those the procedure of example 33 may be used with the HPA substituted by ammonia or with amines, preferably tertiary amines, to present amine groups on the fiber surface, or substituted by methacrylic acid or similar acidic acrylates to present carboxyl groups.

To demonstrate the increased protein adsorption, the nylon copolymer porous medium of example 37 was grafted using the grafting procedure of example 33, with helium in the first step and ammonia in the second step, and the product was then BSA tested; the BSA adsorption was 60 μg per 13 mm test disc. In a similar test methacrylic acid was used in the second step, achieving an adsorption level of 59 μg/13 mm disc. These alternates provide a choice of alkaline or acidic groups.

Examples 17 to 40 were prepared using melt-blown fibrous media with average fiber diameters ranging from 1 to 10.2 μm. Similar products have been made with average fiber diameters as large as about 20 to 25 μm, however, in media with relatively higher voids volumes the capillary force may be so small as to cause longer lateral flow times when a strip of medium is in a near to vertical position; for this reason fiber diameters in the range above about 10 to 20 μm are less desirable, but may be used in conjunction with voids volumes less than about 70 to 80%.

Multilayered Products

The porous sheet media of the invention may be insufficiently rigid for some applications, for example for use in diagnostic devices. It may further be desirable to protect the porous media from mechanical damage during manufacture or from abuse during use. It may also be desired to attach a porous sheet to a supporting film in order to more conveniently carry it through an automated manufacturing process, for example to attach the porous sheet medium to a strip of polyester film, which may be perforated with holes which mate with sprockets similar to those used for photographic film. It is also not unusual for diagnostic devices to require two porous media layers to be bonded together while permitting free transfer of fluids between the layers.

For example, U.S. Pat. No. 5,266,219 discloses devices which are intended to be used to separate plasma from a specimen of blood, such as might be obtained by a finger prick. These devices require a porous sheet material of the invention to be attached to a membrane filter of pore diameter such that the red cells contained in the blood are retained and are unable to enter the membrane while the plasma is free to pass into and through the membrane.

The products and procedures of U.S. Pat. No. 5,266,219 have not been entirely satisfactory. Two reasons are believed to account for this. First, the porous medium which constitutes the upper layer to which the blood specimen is applied was unavailable with a sufficient degree of uniformity to make the product reproducible; the best porous medium available was visually striped and was not uniform, as was visually evident by observing that it was striped with the weight of material in the darker portion of the stripe being about twice or more the weight in the lighter portion of the stripe. The second cause was a weak bond between the porous medium and the membrane; since no permeable adhesive was available at the time the two layers were simply pressed together, thereby forming a very weak bond. Obtaining even a tenuous bond required excessive compression of the porous material. In these and similar applications the methods of the invention may be used to firmly bond two layers together with minimal compression, thereby developing a bond of high strength while retaining high permeability to fluids in the porous layer(s).

The surface(s) to be bonded may be prepared for bonding by using the scanning method of the present invention to deposit on one or both surfaces as the bonding agent a low melting resin of fibrous form. Preferably the resin has a glass transition temperature well below ambient temperature and a melting or softening point below those of the materials to be bonded. Polyethylene and PETG (a polyester made with an excess of glycol) are examples of low melting bonding resins which may be used to bond PBT, nylon, polyethylene terephthalate, and other solid and porous materials.

The low melting resin is fiberized using the scanning method of the invention with the resin delivery and scanning rates adjusted to deposit preferably about 1 to 20 g/m² of bonding fiber about 2 to about 10 μm in fiber diameter, or more preferably about 2 to 5 g/m² of bonding fiber about 3 to about 7 μm in diameter. The bonding fibers are impinged on either or both of the surfaces to be attached.

When the binder fiber has been deposited on the surface or surfaces to be bonded the next step is a short exposure to gentle compression with sufficient heat, preferably applied to the side which is thinner and/or has higher thermal conductivity, to attain a temperature above the melting point of the binder fiber. Heat is preferably maintained for a short time, for example for less than 10 seconds, thereby preventing loss of the molten binder fiber, which if exposed to heat for a long period might migrate into the porous medium due to its capillarity, thereby reducing the affectivity of the bond.

In the present invention the fiber diameters and the weight per unit area of the binder fiber are such as to cover between about 1 to 30% of the area of the surface to which it is applied, and preferably between about 1 and 10% of the surface, and more preferably between about 2 and 5 percent of the surface, the more preferred range leaving about 95 to 98% open the surface on which the binder fibers were deposited. In this manner, in for example U.S. Pat. No. 5,266,219, transfer of plasma by capillarity between the porous medium and the membrane is free to proceed rapidly, while assuring that the two layers are well adhered to each other, and, because only gentle compression has been used, the two layers need not have been significantly reduced from their starting thicknesses or indeed not reduced at all.

Figure 11:
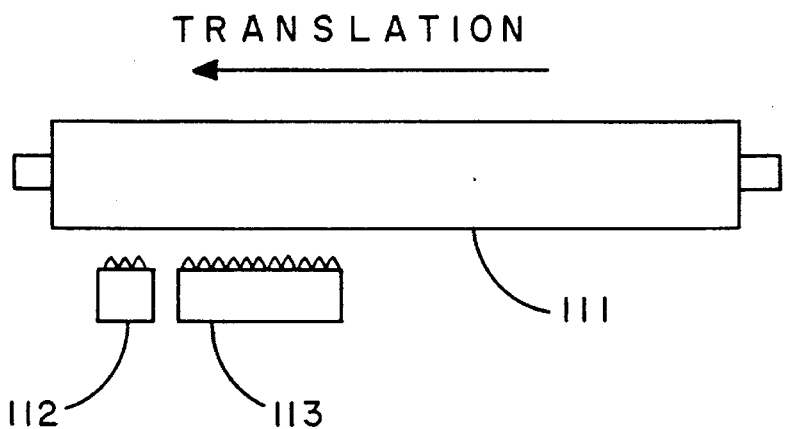
FIG. 11 is a side view of a melt-blowing apparatus useful in the preparation of laminates in accordance with the present invention.

In a preferred method for accomplishing the bonding of two layers, the binder fiber is deposited on the porous medium in the same operation in which the porous medium is formed, using an arrangement such as that shown in FIG. 11, in which the smaller of the two fiberizers 112 and 113 deposits binder fiber on a porous medium of the invention as it is being formed on the collector cylinder 111, all during a single traverse of the target cylinder 111 as it travels in the direction of the arrow.

The products described in the '219 patent also benefit greatly from the availability of the fibrous media of the invention by substituting them for the nonuniform fibrous media previously available. The methods of the invention provide thinner layers of very uniform higher voids volume media, for example with the 94% voids volume of example 3, permitting plasma to be obtained with high efficiency from very small samples of blood, for example from as little as 10 µl of blood, while providing sufficient plasma to perform a diagnostic test.

With these improvements the devices of the '219 patent are well suited for automated production of a much improved product for obtaining plasma from small samples of blood.

In another application of the bonding system of the invention, the bonding agent has been applied to the surface of a membrane or other porous medium which may have an absolute removal rating in the range of about 0.04 to 10 µm, which is then bonded to a grooved plate for use in the dynamic microfilter described in the copending U.S. patent application Ser. No. 08/038,257.

Uniformity of the Products of the Invention

The methods of the invention make possible products with uniformity better than have been previously achieved by a melt-blowing process.

Among the tests which may be used to define uniformity of melt-blown products are: uniformity of fiber diameter; freedom from roping, in which pairs or triplets of fibers are twisted about each other; freedom from twinning, in which pairs of fibers are joined to each other along their length; a relatively narrow range of fiber diameter; and, most importantly, uniformity of weight and thickness from one part of the web to another.

Products which are closer to uniformity in fiber diameter perform better when compared with less uniform products, because their pore sizes are more uniform, by virtue of which, when used for filtration, they retain finer particles more efficiently and pass filtered liquid with lower pressure drop. Roping and twinning effectively increase fiber diameter and cause fiber size distribution to be less uniform, hence are undesirable. Filters which are heavier or thicker from one place to another perform less efficiently because the thinner portions are less efficient with respect to particle removal, and the thicker portions increase the pressure drop generated by the passage of water through the filters. Non-uniform media perform poorly when used in diagnostic devices when used for lateral flow transfer of liquids.

EXAMPLE 42

Figure 12:
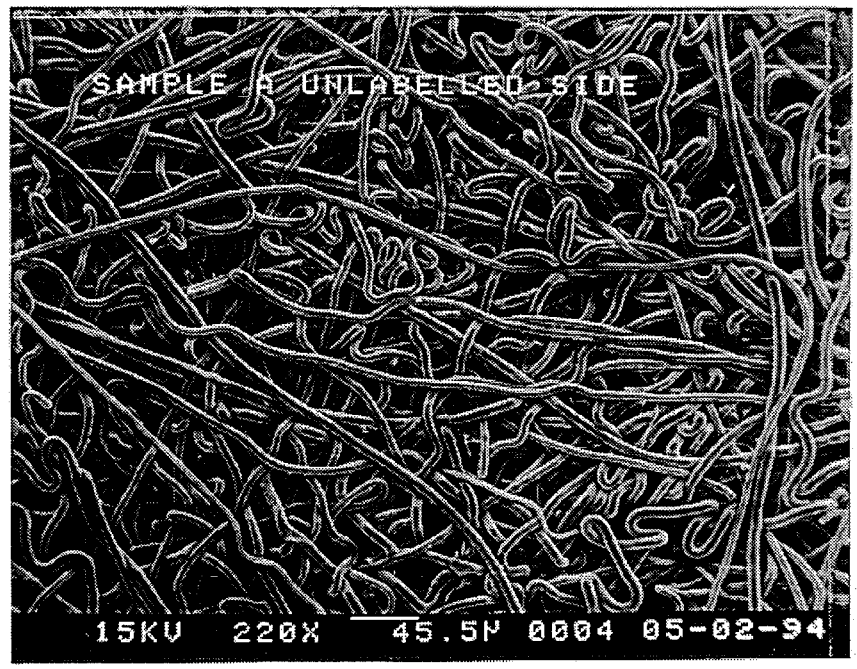
FIG. 12 is a scanning electron micrograph (220×) of a melt-blown fibrous nonwoven web prepared in accordance with the present invention.

A porous sheet 45×100 cm was prepared using the crossed fiber streams and the scanning system of the present invention with 3.2 cm of vacuum applied at connection 62 in FIG. 6, using a 0.13 cm diameter air nozzle and air pressure of 0.5 kg/cm$^2$ PBT resin rate 0.51 g per minute per nozzle of resin at 302° C., and a DCD of 4.1 cm; thickness was 0.020 cm, and weight was 0.0054 g/cm$^2$. An SEM of this specimen is shown in FIG. 12 at 220×. The diameters of all of the fibers shown on this photo and on three photos of neighboring areas were measured. More than 95% of the fibers were within the range of 3.5 to 7.7 µm diameter, i.e., a ratio of 1:2.2, which is a remarkably narrow fiber diameter range for a melt-blown product. The narrow fiber diameter range of the product made it practical and fast to determine the RMS average diameter by microscopy to be 5.9 µm with a standard deviation of 1.4 µm. Other examples of the present invention were similarly evaluated, and the results summarized in Table VII.

EXAMPLE 43

A porous fibrous sheet 45×100 cm was prepared using the crossed fiber streams and the scanning system of the present invention in the manner described for example 42 except that the air nozzle diameter was 0.11 cm diameter, the air pressure was 14 Kg/cm$^2$ and the DCD was 3.3 cm. The fiber diameter characteristics are shown in Table VII.

EXAMPLE 44

A porous fibrous sheet was prepared in a manner identical to example 43 except that the air pressure was 1.06 Kg/cm$^2$. The fiber diameter characteristics are shown in Table VII.

TABLE VII

| Porous Medium Example Number | 90% of the Fibers in diameter range (µm) | Ratio max min | Average fiber diameter, µm (arithmetic) |
| --- | --- | --- | --- |
| 1 | 2.5–6.2 | 2.50 | 4.0 |
| 3 | 0.5–1.6 | 3.2 | 0.9 |
| 6 | 0.6–1.6 | 2.67 | 1.1 |
| 9 | 0.9–2.5 | 2.78 | 1.4 |
| 10 | 1–3 | 3.00 | 1.9 |
| 14 | 5–12 | 2.40 | 7.9 |
| 15 | 6.5–15 | 2.30 | 10.6 |
| 38 | 1.4–3.9 | 2.78 | 2.4 |
| 39 | 3.5–7.8 | 2.22 | 5.5 |
| 40 | 5.1–11.3 | 2.21 | 7.9 |
| 41 | 6.7–13.3 | 1.98 | 10.0 |
| 42 | 3.5–7.7 | 2.20 | 5.9 |
| 43 | 4.2–7.7 | 1.83 | 5.9 |
| 44 | 6.4–10.1 | 1.58 | 8.1 |

EXAMPLE 45

Figure 13:
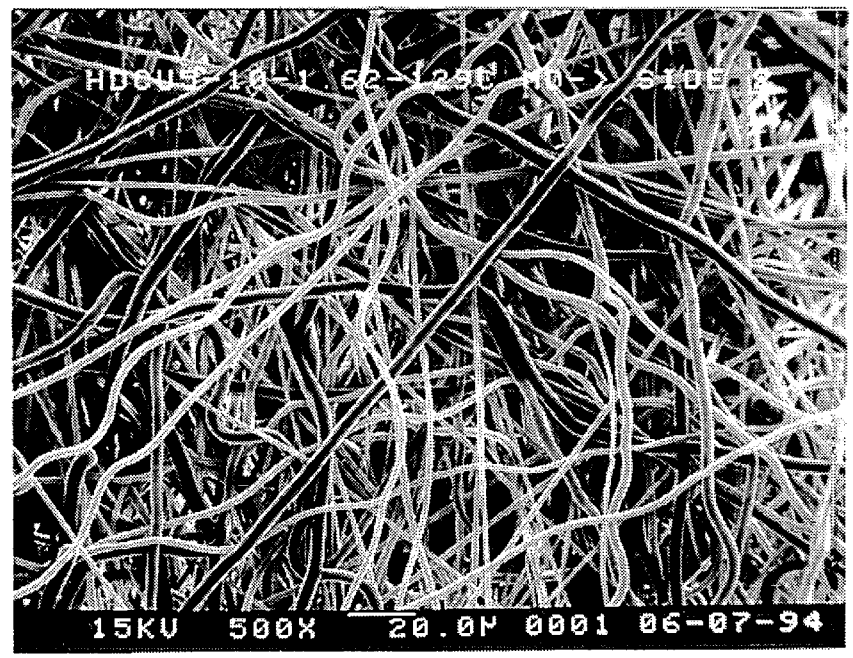
FIG. 13 is a scanning electron micrograph (500×) of a melt-blown fibrous nonwoven web prepared in accordance with the present invention.

Example 45 was prepared in the same manner as example 42 except that the air nozzle diameter was 0.17 cm, the air pressure was 0.74 kg/cm$^2$ and the resin temperature was 304° C. The resulting product is shown in the SEM of FIG. 13 at 500×. Compared with FIG. 12, FIG. 13 appears at first glance to be less uniform. On analysis, a count of 100 fibers showed 39% of the fibers (those seen in the foreground) to be in the diameter range of 2.5 to 4.5 µm, with an average diameter of 4.2 µm, and the remaining 61%, in the lower plane of the SEM, were in the range of 1.1 to 2.3 µm, with an average diameter of 1.9 µm; only one fiber of the 100 counted was found between 2.3 and 2.8 µm, compared with 23 fibers between 2.2 and 2.3 µm and 27 fibers between 2.8 and 3.5 µm. This clearly establishes a bimodal distribution, which could be explained if the larger diameter fibers were assumed to travel directly from the fiberizer nozzles to the collector cylinder, whereas those of smaller diameter representing fibers which were diverted by the aerodynamics to travel a longer distance prior to contacting the collector cylinder are seen to be oriented, with their direction of travel and deposition being in the CMD. The two types of fibers are each within a diameter range max.:min. of approximately 2:1.

EXAMPLE 46

Figure 14:
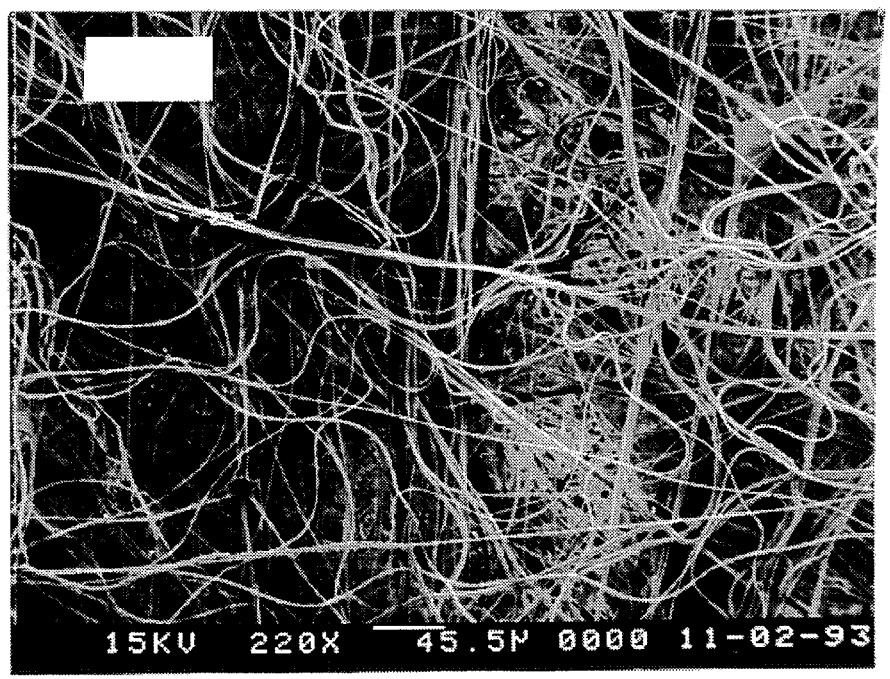
FIG. 14 is a scanning electron micrograph (220×) of a typical commercially available melt-blown fibrous nonwoven web.

Example 42 (FIG. 12) may be compared with the SEM of example 46 shown in FIG. 14, a typical commercial product, which has 90% of its fibers in the range between about 0.5 and 5 µm, i.e., a max/min ratio of 10:1, not counting the oddly shaped mass in the upper left quadrant of the picture. Note also the large number of twinned fibers, along with occasional light roping.

EXAMPLE 47

Direct measurement of weight uniformity was accomplished by cutting 1" squares from test sheets. In one such test a 0.0064 g/cm² polypropylene sheet made using the process of the invention was cut along its 96 cm length to provide 91 2.540 cm squares representative of the length, or machine direction, of the sheet. Each square was weighed, and the linear average was calculated to be 0.0410 g/cm² with a probable error of 0.8% Uniformity in the cross-machine direction of the 46 cm width of the sheet was similarly determined by cutting 39 2.540 cm squares in the cross machine direction; these were also 0.0410 g/cm² in average weight, with a probable error in the linear average of 0.7%. Of these probable error estimates, 0.2 to 0.3% or more may be due to errors in the dimensions of the cut squares.

EXAMPLE 48

An alternate means to determine uniformity of weight was provided by the use of a β-ray backscatter instrument, Model 103, made by the NDC Systems of 730 East Cypress Avenue, Monrovia, Calif. This instrument is fitted with a 0.64 cm diameter lens through which a controlled beam of β-radiation is passed. The lens is surrounded by a 3.5 cm diameter peripheral backscatter collection system. The quantity of backscattered radiation is, when averaged, proportional to the weight per unit area of the sheet. The instrument is fitted with a recording system and with means to scan the lens assembly at a uniform rate, for example at 1.3 cm/second, over the surface of the sheet of which the weight is to be measured. The sheet of which the measurement is made must be suspended from its edges in a manner such that no metal is less than about 10 cm distant from the lens.

As described herein, the scanning was accomplished by a simple pass at 1.3 cm/second in one direction over the sheet to be tested with the concentric lens assembly in light contact with the surface of the sheet. The recorder measures the numbers and intensity of the individual backscattered β-rays and averages their energy over a ten second period, providing a continuous line on the recorder chart. The accuracy of the system is such that when the sensor is repeatedly exposed to the identical cycle the recorded signal may vary on average by about ±0.5%.

Figure 15:
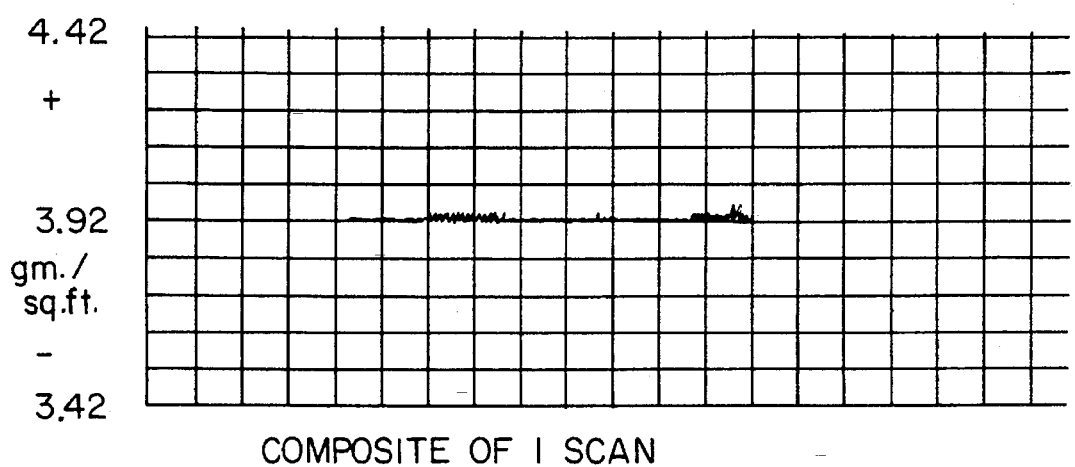
FIG. 15 depicts a β-ray backscatter record in the cross-machine direction for a melt-blown fibrous nonwoven web prepared in accordance with the present invention.
Figure 16:
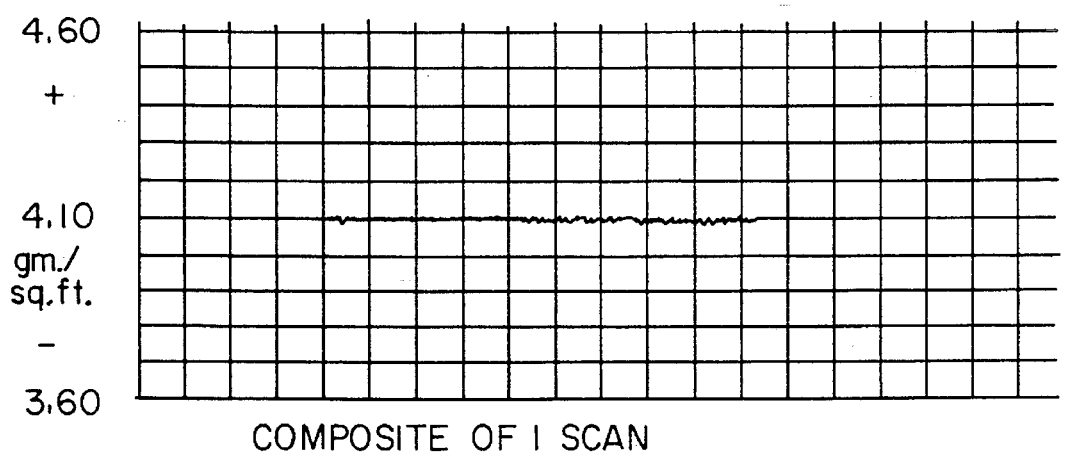
FIG. 16 depicts a β-ray backscatter record in the machine direction for the same melt-blown fibrous nonwoven web prepared in accordance with the present invention as is the subject of FIG. 15.

FIGS. 15 and 16 shows the records obtained when a typical product of the present invention is scanned in the cross-machine direction and in the machine direction, respectively. In FIG. 15 the maximum deviation from the mean weight is (3.96–3.91)/2 or 0.025 grams/sq. ft. (0.27 g/m²), in a sheet weight of 3.94 grams/sq. ft. (42 g/m²), hence with a maximum deviation from the mean of 0.64%. Maximum deviation in the machine direction is shown in FIG. 16 to be 0.26%.

EXAMPLE 49

A typical product of the invention in the form of a 50×100 cm sheet with 85% voids volume was tested to determine its thickness 48 places on 10 cm centers. The mean thickness was 0.027 cm, the standard deviation was 0.7%, and the probable error was 0.4%, indicating a thickness uniform to within 1%.

All of the references cited herein, including publications, patents, and patent applications, are hereby incorporated in their entireties by reference.

While this invention has been described with an emphasis upon preferred embodiments, it will be obvious to those of ordinary skill in the art that variations of the preferred embodiments may be used and that it is intended that the invention may be practiced otherwise than as specifically described herein. Accordingly, this invention includes all modifications encompassed within the spirit and scope of the invention as defined by the following claims.

What is claimed is:

1. A melt-blown fibrous nonwoven web of fibers wherein 90% of the fibers of said web have a diameter ranging from a minimum fiber diameter to a maximum fiber diameter which is no more than about three times the minimum fiber diameter.

2. The melt-blown fibrous nonwoven web of claim 1, wherein said fibers have an average fiber diameter of less than about 50 µm.

3. The melt-blown fibrous nonwoven web of claim 2, wherein said fibers have an average fiber diameter of less than about 20 µm.

4. The melt-blown fibrous nonwoven web of claim 3, wherein said fibers have an average fiber diameter of about 6–10 µm.

5. The melt-blown fibrous nonwoven web of claim 3, wherein said fibers have an average fiber diameter of less than about 2 µm.

6. The melt-blown fibrous nonwoven web of claim 5, wherein said fibers have an average fiber diameter of less than about 1 µm.

7. The melt-blown fibrous nonwoven web of claim 1, wherein 90% of the fibers of said web have a diameter ranging from a minimum diameter to a maximum fiber diameter which is no more than about two times the minimum fiber diameter.

8. The melt-blown fibrous nonwoven web of any of claims 1–7 characterized by a weight distribution varying by less than 1% when measured in both the longitudinal and transverse directions, said weight distribution measured along 0.64×13 cm areas and on 2.54 cm squares.

9. The melt-blown fibrous nonwoven web of claim 8, wherein the web are substantially free of roping, twinning, and shot.

10. The melt-blown fibrous nonwoven web of claim 1, wherein said web is characterized by a tensile strength in a first direction at least about 1.5 times the tensile strength in a second direction 90° to the first direction.

11. The melt-blown fibrous nonwoven web of claim 10, wherein the tensile strength in the first direction is at least 2 times the tensile strength in the direction 90° to the first direction.

12. The melt-blown fibrous nonwoven web of claim 11, wherein the tensile strength in the first direction is at least 4 times the tensile strength in the direction 90° to the first direction.

13. The melt-blown fibrous nonwoven web of claim 1, wherein said web is characterized by a 2 cm lateral flow time of about 40 seconds or less in a first direction.

14. The melt-blown fibrous nonwoven web of claim 1, wherein said web is characterized by a 4 cm lateral flow time of about 225 seconds or less in a first direction.

15. The melt-blown fibrous nonwoven web of claims 13 or 14, wherein the lateral flow time in a second direction 90° to the first direction is different than the lateral flow time in the first direction.

16. The melt-blown fibrous nonwoven web of claim 13, wherein said web exhibits substantially no bead front lag.

17. The melt-blown fibrous nonwoven web of claim 14, wherein said web exhibits substantially no bead front lag.

18. The melt-blown fibrous nonwoven web of claim 15, wherein said web exhibits substantially no bead front lag.

19. The melt-blown fibrous nonwoven web of claim 18, wherein said web comprises fibers having an average fiber diameter of less than about 1 µm.

20. A porous composite structure comprising at least one porous sheet containing thereon a melt-blown fibrous nonwoven web of claim 1, wherein no more than about 10% of the pores of said porous sheet are blocked by said melt-blown fibrous nonwoven web.

21. The porous composite structure of claim 20, wherein the melting point of said fibrous melt-blown nonwoven web is lower than that of an adjoining porous sheet.

22. The porous composite structure of claim 21, wherein no more than about 5% of the pores of said porous sheet are blocked by said melt-blown fibrous nonwoven web.

23. The porous composite structure of claim 21, wherein at least one porous sheet is a melt-blown fibrous nonwoven web.

24. The porous composite structure of claim 21, wherein two porous sheets are bound together by said melt-blown fibrous nonwoven web.

25. The porous composite structure of claim 21, wherein one of said porous sheets is a microporous membrane and the other of said porous sheets is a melt-blown fibrous nonwoven web.

26. The porous composite structure of claim 21 comprising an impermeable sheet and a melt-blown fibrous nonwoven web adhered thereto.

27. A porous composite structure comprising a microporous membrane and a melt-blown fibrous nonwoven web of claim 1 secured thereto.

28. A porous composite structure comprising a microporous membrane and a melt-blown fibrous nonwoven web of claim 8 secured thereto.

29. A porous composite structure comprising an impermeable sheet and the melt-blown fibrous nonwoven web of claim 13 bonded thereto.

30. A porous composite structure comprising an impermeable sheet and the melt-blown fibrous nonwoven web of claim 14 bonded thereto.

31. A porous composite structure comprising an impermeable sheet and the melt-blown fibrous nonwoven web of claim 15 bonded thereto.

32. The melt-blown fibrous nonwoven web of claim 7, wherein said fibers have an average fiber diameter of less than about 50 µm.

33. The melt-blown fibrous nonwoven web of claim 32, wherein said fibers have an average fiber diameter of less than about 20 µm.

34. The melt-blown fibrous nonwoven web of claim 33, wherein said fibers have an average fiber diameter of about 6–10 µm.

35. The melt-blown fibrous nonwoven web of claim 33, wherein said fibers have an average fiber diameter of less than about 2 µm.

36. The melt-blown fibrous nonwoven web of claim 35, wherein said fibers have an average fiber diameter of less than about 1 µm.

37. The melt-blown fibrous nonwoven web of claim 7, wherein 90% of the fibers of said web have a diameter ranging from a minimum diameter to a maximum fiber diameter which is no more than about 1.5 times the minimum fiber diameter.

38. The melt-blown fibrous nonwoven web of claim 37, wherein said fibers have an average fiber diameter of less than about 50 µm.

39. The melt-blown fibrous nonwoven web of claim 38, wherein said fibers have an average fiber diameter of less than about 20 µm.

40. The melt-blown fibrous nonwoven web of claim 39, wherein said fibers have an average fiber diameter of about 6–10 µm.

41. The melt-blown fibrous nonwoven web of claim 39, wherein said fibers have an average fiber diameter of less than about 2 µm.

42. The melt-blown fibrous nonwoven web of claim 41, wherein said fibers have an average fiber diameter of less than about 1 µm.

43. The melt-blown fibrous nonwoven web of claim 1, wherein said web has a voids volume of about 60% to about 94%.

44. The melt-blown fibrous nonwoven web of claim 1, wherein said web has a CWST of about 73 dynes/cm or more.

45. The melt-blown fibrous nonwoven web of claim 44, wherein said web has a CWST of about 73 dynes/cm to about 110 dynes/cm.

46. The melt-blown fibrous nonwoven web of claim 1, wherein said web comprises a polymer selected from the group consisting of polybutylene terephthalate, polypropylene, polyethylene, polymethylpentene, polychlorotrifluoroethylene, polyphenyl sulfide, poly(1,4-cyclohexylene dimethylene terephthalate), PETG, a polyester polymerized with an excess of glycol, nylon 6, nylon 66, nylon 612, nylon 11, and a nylon 6 copolymer of 80% nylon 6 with 20% polyethylene-oxide-diamine.

47. The melt-blown fibrous nonwoven web of claim 46, wherein said web comprises a polymer selected from the group consisting of polybutylene terephthalate, nylon 6, nylon 66, and a nylon 6 copolymer of 80% nylon 6 with 20% polyethylene-oxide-diamine.

48. The melt-blown fibrous nonwoven web of claim 47, wherein said web comprises polybutylene terephthalate.

49. The melt-blown fibrous nonwoven web of claim 47, wherein said web comprises a nylon 6 copolymer of 80% nylon 6 with 20% polyethylene-oxide-diamine.

50. A filter comprising the melt-blown fibrous nonwoven web of any of claims 1–9 and a housing therefor.

51. A diagnostic device for use with a specimen comprising the melt-blown fibrous nonwoven web of any of claims 1–9.

52. The porous composite structure of claim 20, wherein a fibrous bonding agent attaches said porous sheet to said melt-blown fibrous nonwoven web.

53. The porous composite structure of claim 52, wherein said fibrous bonding agent comprises fibers having an average fiber diameter of about 2 µm to about 10 µm.

54. The porous composite structure of claim 53, wherein said fibrous bonding agent comprises fibers having an average fiber diameter of about 3 µm to about 7 µm.

55. The porous composite structure of claim 52, wherein said fibrous bonding agent comprises polyethylene.

56. The porous composite structure of claim 53, wherein said fibrous bonding agent comprises polyethylene.

57. The porous composite structure of claim 52, wherein said fibrous bonding agent comprises PETG.

58. The porous composite structure of claim 53, wherein said fibrous bonding agent comprises PETG.

59. A method of filtering a fluid comprising passing a fluid through the melt-blown fibrous nonwoven web of any of claims 1–9.

60. A method of processing a fluid comprising contacting the melt-blown fibrous nonwoven web of any of claims 1–9 with said fluid.

* * * * *

UNITED STATES PATENT AND TRADEMARK OFFICE
CERTIFICATE OF CORRECTION

PATENT NO. : 5,582,907
DATED : December 10, 1996
INVENTOR(S) : Pall

It is certified that error appears in the above-indentified patent and that said Letters Patent is hereby corrected as shown below:

In Column 4, line 24: "A—A" should read --4B—4B--.
In Column 4, line 30: "A—A" should read --6B—6B--.
In Column 7, line 9: "A—A" should read --4B—4B--.
In Column 8, line 56: "A—A" should read --6B—6B--.
In Column 23, line 17: "increased,," should read -increased,--.

Signed and Sealed this

Fifteenth Day of April, 1997

*Attest:*

BRUCE LEHMAN

*Attesting Officer*   Commissioner of Patents and Trademarks